US012606689B2

(12) United States Patent
Cho et al.

(10) Patent No.: US 12,606,689 B2
(45) Date of Patent: Apr. 21, 2026

(54) DEPOLYMERIZATION CATALYST OF POLYMER COMPRISING ESTER FUNCTIONAL GROUP, AND DEPOLYMERIZATION METHOD USING SAME

(71) Applicant: KOREA RESEARCH INSTITUTE OF CHEMICAL TECHNOLOGY, Daejeon (KR)

(72) Inventors: Joungmo Cho, Daejeon (KR); Dinh Duong Pham, Daejeon (KR); Thi Hong Ngan Le, Daejeon (KR)

(73) Assignee: KOREA RESEARCH INSTITUTE OF CHEMICAL TECHNOLOGY, Daejeon (KR)

( * ) Notice: Subject to any disclaimer, the term of this patent is extended or adjusted under 35 U.S.C. 154(b) by 631 days.

(21) Appl. No.: 18/022,474

(22) PCT Filed: Sep. 17, 2021

(86) PCT No.: PCT/KR2021/012774
§ 371 (c)(1),
(2) Date: Feb. 21, 2023

(87) PCT Pub. No.: WO2022/060153
PCT Pub. Date: Mar. 24, 2022

(65) Prior Publication Data
US 2024/0417527 A1     Dec. 19, 2024

(30) Foreign Application Priority Data
Sep. 18, 2020    (KR) ........................ 10-2020-0120240

(51) Int. Cl.
*C08J 11/24*     (2006.01)
*C08J 11/16*     (2006.01)

(52) U.S. Cl.
CPC ................ *C08J 11/24* (2013.01); *C08J 11/16* (2013.01); *C08J 2333/06* (2013.01)

(58) Field of Classification Search
USPC ...................................................... 521/48.5
See application file for complete search history.

(56) References Cited

U.S. PATENT DOCUMENTS

| | | | |
|---|---|---|---|
| 8,309,618 B2 | 11/2012 | Hedrick et al. | |
| 9,549,654 B1 | 1/2017 | Williams et al. | |
| 2008/0125530 A1 | 5/2008 | Spitzer et al. | |

FOREIGN PATENT DOCUMENTS

| | | | | |
|---|---|---|---|---|
| CN | 105175268 A | 12/2015 | | |
| JP | H09296036 A | 11/1997 | | |
| JP | H10259151 A | 9/1998 | | |
| JP | H10278841 A | 10/1998 | | |
| JP | 2004323378 A | * | 11/2004 | |
| JP | 2008088096 A | 4/2008 | | |
| JP | 4602469 B2 | 12/2010 | | |
| KR | 20060127925 A | 12/2006 | | |
| KR | 20180027539 A | 3/2018 | | |
| KR | 20200093525 A | * | 8/2020 | ............. C08J 11/24 |
| PL | 216428 B1 | 4/2014 | | |
| WO | WO2013156760 A1 | 10/2013 | | |

OTHER PUBLICATIONS

JP-2004323378-A Machine Translation (Year: 2004).*
KR-20200093525-A Machine Translation (Year: 2020).*
International search report of PCT/KR2021/012774, Dec. 23, 2021, English translation.
Duong Dinh Pham and Joungmo Cho, Low-energy catalytic methanolysis of poly(ethyleneterephthalate), Green Chemistry, 2021, pp. 511-525, vol. 23, The Royal Society of Chemistry, London, United Kingdom.
The extended search report of EP 21 86 9775, Aug. 26, 2024.
Maria Mastihubova et al, Two efficient ways to 2-0- and 5-0-feruloylated 4-nitrophenyl a-L-arabinofuranosides as substrates for differentiation of feruloyl esterases, Tetrahedron Letters, 2003, vol. 44, pp. 1671-1673, Elsevier Science Ltd, Amsterdam, Netherland.
Cristiano Zonta et al, Enantiopure Ti(IV) Amino Triphenolate Complexes as NMR Chiral Solvating Agents, Chirality, 2011, vol. 23, pp. 796-800, Wiley-Liss, Inc, Honoken, NJ, USA.

* cited by examiner

*Primary Examiner* — Terressa Boykin
(74) *Attorney, Agent, or Firm* — STIP Law Group, LLC

(57)        ABSTRACT

The present disclosure relates to a method of polymerizing a polymer having an ester functional group, a catalyst for use in the method, and a composition for use in the method. More specifically, proposed is a method of depolymerizing a polymer having an ester functional group by using potassium carbonate ($K_2CO_3$) as a depolymerization catalyst and an alcohol and a polar aprotic solvent as solvents. In addition, a composition for depolymerizing a polymer having an ester functional group is proposed.

15 Claims, 3 Drawing Sheets

Fig. 1

DEPOLYMERIZATION CATALYST OF POLYMER COMPRISING ESTER FUNCTIONAL GROUP, AND DEPOLYMERIZATION METHOD USING SAME

CROSS-REFERENCE TO RELATED APPLICATIONS

This application is the U.S. National Phase under 35 U.S.C. § 371 of International Application No. PCT/KR2021/012774, filed on Sep. 17, 2021, which in turn claims the benefit of Korean Application No. 10-2020-0120240, filed on Sep. 18, 2020, the disclosures of which are incorporated by reference into the present application.

TECHNICAL FIELD

The present disclosure relates to a method of depolymerizing a polymer having an ester functional group. More specifically, the present disclosure relates to a method of obtaining high-purity monomers by decomposing a polymer having an ester functional group into monomers in the presence of an alcohol as a reactant by adding a polar aprotic solvent and potassium carbonate as a heterogeneous catalyst.

BACKGROUND ART

Plastic is an inexpensive and durable material, and has the advantages of being easily molded and processed. Therefore, plastic is used to produce a variety of products. These advantages have led to a dramatic increase in consumption of plastic materials in industrial and domestic sectors for decades. However, poorly managed plastic waste present as discarded in the environment causes environmental pollution. Especially, microplastics, which are small pieces broken from plastic waste, move around through the entire ecosystem, accumulate in organisms, and eventually enter the human body via dust, drinking water, food, etc. Furthermore, more than 50% of these plastics are used as disposable products for single use, such as packaging, agricultural films, disposable articles, etc., or used as short-term products that are discarded within one year of manufacture.

Most of the plastics that are discarded are carelessly thrown into the designated landfills or natural habitats that are difficult to naturally purify, thereby increasing the severity of environmental pollution. Even naturally degradable or biodegradable plastics can persist for decades, depending on local environmental factors such as levels of UV exposure, temperature, presence of degrading microorganisms, and so on.

To address this problem, several studies are underway to develop novel plastics that are degradable in a short time in natural conditions, to chemically decompose existing petroleum-based plastics, and to physically regenerate or reprocess used plastics. These efforts are to reduce plastic accumulation in environment or reduce the impact of plastics on the environment.

Polymers containing ester functional groups are capable of transforming into monomers through depolymerization, and various chemical reaction routes to monomers from polymers have been found. The monomers produced through depolymerization theoretically have the same properties as fresh raw materials that are put into a polymerization reaction for polymer synthesis. Hydrolysis, glycolysis, methanolysis, and ammonolysis are widely used depolymerization routes that are used to industrially recycle polyesters. Various complex chemical depolymerization processes combining those methods to utilize the advantages of each method are widely used.

Existing methods of depolymerizing polymers having an ester functional group will be described in more detail. In the case of hydrolysis, degradation/decomposition can proceed through various reaction routes in the presence of an acid, a base, or a metal salt catalyst. In the case of using an acid catalyst reaction, an extremely high concentration of sulfuric acid solution is required to obtain a high reaction yield. For this approach, economic problems arising due to design, operation, and post treatment are posited out as disadvantages. In the case of using a base and a metal salt catalysts, the decomposition reaction is extremely slow, the product purity is low, and the catalyst recovery is difficult. Therefore, this method is inefficient.

Glycolysis refers to a polymerization reaction that adds glycol as a reactant. The most common example of glycolysis is a process of preparing Bis(2-hydroxyethyl)terephthalate (BHET) by adding an excessive amount of ethylene glycol (EG), which is one of the monomer raw materials. Since EG, which is one of the PET raw materials, is used as a reactant, there is high thermodynamic miscibility with reaction products. In addition, this reaction can be directly applied to existing PET production lines. Glycolysis is typically carried out under reflux conditions of glycol serving as a reactant. Since the degradation from oligomers to monomers is slow, the product purity may be low, and it is difficult to separate monomers as the end products from the reactants. Mainly used reaction catalysts are zinc acetate and lithium acetate. Such a catalyst may not be completely removed during purification and remain in the end product. A metal that is toxic, even in a trace amount, to the human body may be included in the regenerated monomer. Therefore, it is difficult to reuse this regenerated monomer for the products produced by re-inputting the recovered monomer, especially food, medical products, and other household products. In addition, although glycolysis proceeds at high temperatures, since it is common for the recovery and purification to be performed by a low-temperature recrystallization reaction, there are problems in that the energy consumption is high, the cost for heat supply is high, and process efficiency is low.

Methanolysis is now one of the broadest range of commercial applications, from global chemical companies to the small and medium-sized plastics industry. Dimethyl terephthalate (DMT) which a representative product that can be produced through the methanolysis and can be used as an intermediate raw material for a depolymerization process for producing different monomers (for example, glycolysis). DMT has a relatively low boiling point compared to other monomers, and thus it can be used as a gaseous reactant for producing high value-added diol monomers (for example, 1,4-cyclohexanedimethanol). In addition, DMT is easy to purify and can be used as a raw material for polymerization for PET which requires high purity and high quality. However, due to the use of methanol as a reaction solvent, harsh reaction conditions with high temperature and high pressure are required. Therefore, the equipment design cost is required, and the investment cost is high because post treatment processes such as reactant recovery and product purification are required. As the catalyst, the following catalysts are typically used: magnesium acetate, including zinc acetate, which is a depolymerization catalyst commonly used in glycolysis reactions; cobalt acetate; and exchange esterification reaction catalysts containing a heavy metal such as lead dioxide. However, these catalysts may cause human health problems and environmental problems due to the residual amount of metal in the end product.

For the depolymerization reaction for a polymer having an ester functional group, hydrolysis, and a combination of alkaline decomposition and methanolysis have been widely used. Both reactions have problems in that the reaction time is long when polyester resin is depolymerized at a low temperature, and the quality and quantity of the product produced through the reaction do not meet the expectations. When methanolysis is selected as the reaction route to the production of monomers through depolymerization, the yield and purity of DMT, which is a monomer product, are greatly affected by reaction impurities such as moisture and the reactivity of the catalyst. In order to reduce the burden of the product purification process, effective side reaction inhibition methods and high reactivity are both required.

As a related art, Japanese Patent Application Publication No. 1998-278841 (Patent Document 1) discloses a method of recovering DMT and alkylene glycol at high efficiency by processing waste PET with methanol. When recovering terephthalate dimethyl from a polyalkylene terephthalate polymer, methanol is continuously introduced into a polymer that is at least partially molten to produce terephthalate dimethyl by the hydrolysis reaction of the polyalkylene terephthalate. The reaction is carried out at a hydrolysis reaction temperature in the range of 200° C. to 300° C., and potassium carbonate is used as a catalyst. The method disclosed in the patent document has a disadvantage that the energy consumption is high due to an extremely high hydrolysis reaction temperature.

Korean Patent Application Publication No. 10-2020-0093525 (Patent Document 2) discloses a polymerization process for polyethylene terephthalate (PET). The method involves a process of contacting PET with solvents for swelling polyesters, alcoholic solvents and alkoxides in substoichiometric amounts However, since alkoxides described in the patent document 2 are relatively expensive materials, the process is not cost-effective. Although the depolymerization reactivity is high, since the reactivity of side reactions is also high, it is difficult to control the selectivity of the end product, and alkoxides are dissolved in solvents and are thus difficult to separate.

In addition, U.S. Pat. No. 8,309,618 (Patent Document 3) discloses a process of depolymerizing a polymer having electrophilic linkages. This method is characterized by contacting the polymer with a nucleophilic reagent in the presence of a compound comprising guanidine. However, the method is not economical because the catalyst used is a homogeneous organic catalyst, and the catalyst is not easy to separate after use.

In performing the above-described methanolysis reaction, in the case where the depolymerization reaction rate can be increased, energy consumption is not high, and an eco-friendly catalyst system this is less toxic can be used, the process can be efficiently and economically operated. In addition, The methanolysis reaction is expected to be effectively used to produce regenerated raw materials that are not limited in use in terms of quality by using polymers containing ester functional groups, which occur in large quantities.

DISCLOSURE

Technical Problem

The present disclosure provides a methanol-addition depolymerization method for a polymer having an ester functional group, the method using potassium carbonate as a catalyst for depolymerization through a methanolysis reaction while overcoming the problems occurring in the related art, and using a polar aprotic compound as a solvent for lowering the reaction activation energy.

The present disclosure provides a method of depolymerizing a polymer having an ester functional group, the method using an inexpensive carbon salt catalyst which is present in a heterogeneous state in a reaction mixture and which can be physically recoverable after the reaction.

The present disclosure provides an energy-saving depolymerization method for a polymer having an ester functional group, the method being capable of producing a target product under conditions in which energy consumption is zero or low at each reaction stage ranging from the beginning of the reaction to the purification of the product.

The present disclosure provides a depolymerization method for producing a low-toxic regenerated monomer to be as a raw material that can be reprocessed into the same polymer, a food product, a medical product, or a house product. In the method, a reaction mixture does not contain heavy metals hazardous to the human body or environment, so that the concentration of residual toxic components in a purified monomer product is low.

Technical Solution

In order to accomplish one of the objectives, in one aspect of the present disclosure, there is provided a method of depolymerizing a polymer having an ester functional group by contacting a polymer having an ester functional group with a mixture comprising (1) an alcohol; (2) potassium carbonate ($K_2CO_3$) serving as a catalyst; and (3) a polar aprotic solvent.

In one embodiment of the present disclosure, the alcohol may be a straight-chain primary alcohol. Preferably, the alcohol is methanol.

The polar aprotic solvent may be a chain or cyclic organic compound, an organic compound TO WHICH a halogen element is directly bonded, or an organic compound in which organic compounds are linked to each other by themselves or by oxygen. The cyclic form may include an aromatic ring.

In one embodiment of the present disclosure, the depolymerization reaction for the polymer having the ester functional group may further include removing moisture from one or more materials selected from among the alcohol, the potassium carbonate, the polar aprotic solvent, and the polymer having the ester functional group, which are all raw materials for use in the depolymerization reaction.

In addition, in one embodiment of the present disclosure, when performing the depolymerization of the polymer having the ester functional group, a reaction temperature is in a range of 0° C. to 100° C., and the polymerization is performed in a form in which there is no heat input or output from or to the outside or in a form in which external heating or cooling is performed.

In addition, in one embodiment of the present disclosure, the depolymerization method may further include a process of separating an undissolved solid material from a reaction mixture obtained by the polymerization reaction by filtering the reaction mixture.

In another aspect of the present disclosure, there is provided a method of purifying a monomer obtained by depolymerizing a polymer having an ester functional group, the method including: causing deactivation of a catalyst by adding an acid or an ion exchange resin to the reaction mixture containing the monomer obtained by the depolymerization method of the present disclosure; and partially or completely separating or recovering the solvent used for the depolymerization by filtration, distillation, evaporation, drying, extraction, or any combination thereof.

The purification method may further include recovering a highly purified monomer by performing an evaporation or distillation process on the mixture from which the solvent has been partially or completely removed.

In a further aspect of the present disclosure, there is provided a method of purifying a monomer produced through depolymerization of a polymer having an ester functional group, the method including: performing filtration, distillation, evaporation, drying, extraction, or any combination thereof on the reaction mixture containing the monomer obtained by the depolymerization method of the present disclosure to partially or completely separate or recover the solvent used in the depolymerization; adding an excessive amount of water to a target solution that remains after the partial or complete separation or recovery of the solvent is performed, to recrystallize the monomer; and performing filtration, evaporation, drying, or any combination thereof on the recrystallized monomer to obtain a highly purified monomer.

In a yet further aspect of the present disclosure, there is provided a depolymerization composition for depolymerizing a polymer having an ester functional group, the composition including (1) an alcohol, (2) potassium carbonate ($K_2CO_3$) serving as a catalyst, and (3) a polar aprotic solvent.

Advantageous Effects

The depolymerization method for a polymer having an ester functional group, according to the present disclosure, does not require a high investment cost due to the simplicity of the process. In addition, the depolymerization method can considerably reduce energy consumption as compared to conventional processes because methanol addition depolymerization can be performed at high yields even at low temperatures. Due to the advantages, it is possible to implement an environment-friendly process in which carbon dioxide emissions are significantly reduced.

In addition, a variety of types of catalysts can be applied to the technology according to the present disclosure. Especially, since a recoverable catalyst that is inexpensive and relatively low toxic compared to existing commercially available catalysts (for example, zinc acetate) is used, it is possible to produce products that are not hazardous to the human body, are environmentally friendly, and are economical.

In addition, the high purity monomers (raw materials of the polymer) can be recovered from the products produced by the depolymerization method of the present disclosure, and can be industrially reused.

DESCRIPTION OF DRAWINGS

FIG. 1 is a $^1$H NMR spectrum of DMT obtained by PET depolymerization according to one comparative example of the present disclosure.

BEST MODE

Figure 2:
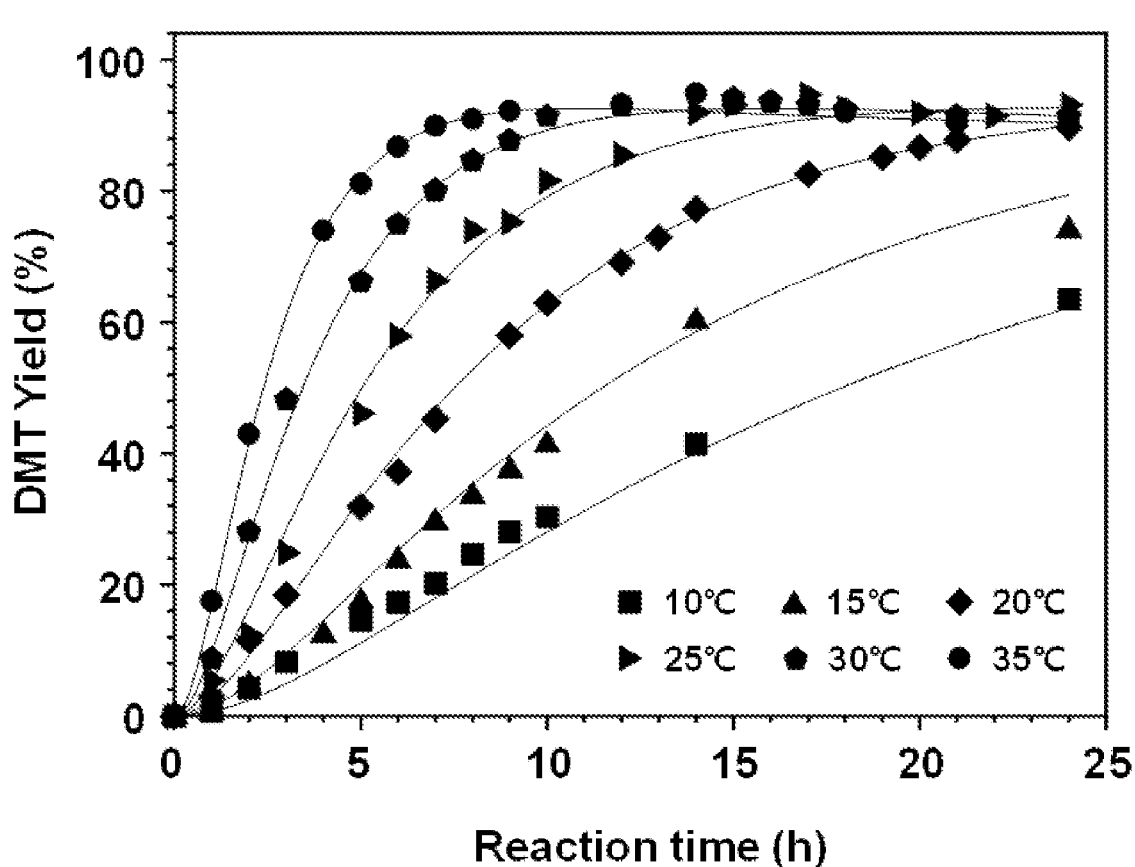
FIG. 2 is a diagram illustrating, as a function of reaction time, the yield of a monomer prepared through methanolysis at different reaction temperatures, in order to observe the characteristics of a PET depolymerization reaction performed according to an example of the present disclosure.

Unless otherwise defined, all terms including technical and scientific terms used herein have the same meaning as commonly understood by those who are ordinarily skilled in the art to which the present disclosure pertains. In general, the nomenclature used herein is that well known and commonly used in the art.

It will be further understood that the terms "comprise", "include", or "have", when used in this specification, specify the presence of an element, but do not preclude the presence or addition of one or more other elements unless the context clearly indicates otherwise.

According to the present disclosure, a depolymerization method for a polymer having an ester functional group is characterized by contacting a mixture comprising (1) an alcohol, (2) a potassium carbonate ($K_2CO_3$) as a catalyst, and (3) a polar aprotic solvent, with the polymer including the ester functional group, thereby preparing an alcohol-added monomer through an exchange esterification reaction. The process is simple and has a high yield and a high price competitiveness.

The method of the present disclosure is useful for the depolymerization of a polymer having an ester functional group. The polymer having the ester functional group may be a single type of waste plastic or a mixed type. Specifically, the mixed type may refer to a form in which polymer having the ester functional group may be polyethylene, high-density polyethylene, low-density polyethylene, polypropylene, or any combination thereof is mixed with the polymer having the ester functional group. The above-mentioned polymers that are to be mixed with the polymer having the ester functional group are presented only for the illustrative purposes and are not limited thereto.

In addition, the polymer having the ester functional group may be a polymer formed by condensation polymerization of dicarboxylic acid with a diphenyl alcohol. The dicarboxylic acid is selected from the group consisting of terephthalic acid, naphthalene dicarboxylic acid, diphenyldicarboxylic acid, diphenyldicarboxylic acid, diphenyl ether dicarboxylic acid, diphenylsulfondicarboxylic acid, diphenoxyethanedicarboxylic acid, succinic acid, adipic acid, sebacic acid, azelaic acid, decandicarboxylic acid, cyclohexanedicarboxylic acid, trimethylic acid, pyromelic acid and combinations thereof. The dialcohol is selected from the group consisting of ethylene glycol, trimethylene glycol, 1,2-propanediol, tetramethylene glycol, neopentyl glycol, hexamethylene glycol, decane glycol, methylene glycol, dodecylene glycol, docarboxylic acid, docarboxylic acid, 1,4-cyclohexanedimethanol, diethylene glycol, triethylene glycol, tetraethylene glycol, polyethylene glycol, dipropylene glycol, tripropylene glycol, tetrapropylene glycol, polypropylene glycol, di(tetramethylene)glycol, tri(tetra methylene)glycol, polytetramethylene glycol, pentaerythritol, 2,2-bis(4-β-hydroxyethoxyphenyl)propane and combinations thereof.

For example, the polymer having the ester functional group may be selected from the group consisting of polyethylene terephthalate (PET), polypropylene terephthalate (PPT), polyglycolide or polyglycolic acid (PGA), polylactic acid (PLA), polycaprolactone (PCL), polyhydroxyalkanoate (PHA), polyhydroxybutyrate (PHB), polyethylene adipate (PEA), polybutylene succinate (PBS), poly (3-hydroxybutyrate-co-3-hydroxyvalerate) (PHBV), polybutylene terephthalate (PBT), polytrimethylene terephthalate (PTT), polyethylene natalate (PEN), vectoran, and combinations thereof.

One of the most common polymers having the ester functional group is polyethylene terephthalate (PET), and the starting material for the polymer preparation is terephthalic acid or a derivative monomer thereof, and ethylene glycol.

The polymer having the ester functional group used in the present disclosure may not be in a pure state but be in an impure state in which several impurities are mixed. By way of example, in addition to the polymer having the ester functional group, debris including but not being limited to bottle caps, adhesives, paper, residual liquids, dust, or any combination thereof may be used as the raw materials used for the depolymerization.

The alcohol is a straight-chain primary alcohol. For example, methanol, ethanol, propanol, butanol, or any combination thereof may be used as the alcohol.

The molar ratio of the alcohol to the repeating unit of the raw material polymer having the ester functional group is in a range of 0.1 to 5,000 and preferably in a range of 1 to 500.

The potassium carbonate acts as a catalyst. Potassium carbonate, expressed by the formula $K_2CO_3$, is a white crystal that can dissolve in water. Preferably, an anhydride form of the potassium carbonate is preferably used rather than a hydrate form. Preferably, the potassium carbonate is preferably dried before use. The molar ratio of the potassium carbonate to the repeating unit of the polymer may be 0.001 or more. The molar ratio is preferably in the range of from 0.01 to 10 and more preferably in the range of from 0.05 to 1.

The polar aprotic solvent refers to an organic solvent having polarity. The solvent may have a form in which it consists of only the basic skeletal structure of an organic compound, a form in which a halogen element is directly bonded to the skeletal structure, or a form (for example, ether) in which organic compounds are connected to each other by themselves or by oxygen. The solvent may be any one of the forms or a combination of two or more forms of the above-described forms.

The polar aprotic solvent is used as an organic liquid phase compound that can be used to lower the activation energy for a degradation or exchange esterification reaction of an ester functional group. The polar aprotic solvent is a non-reactive or inert solvent that does not directly participate in the reaction. The polar aprotic solvent induces a heterogeneous catalyst reaction by lowering the solubility of a catalyst (potassium carbonate) with respect to a reactant (alcohol), and is preferable to be able to thermodynamically dissolve the produced monomer.

The polar aprotic solvent may be an organic compound in the form of a chain or a ring. Alternatively, the solvent has a form in which a halogen element is bonded directly to the organic compound, or a form in which an organic compound linked to each other by themselves or the apply itself or to each other by oxygen or nitrogen. Specifically, as the polar aprotic solvent, at least one selected from the following may be used: toluene, xylene, acetone, methylethylketone, methylisobutylketone, acetonitrile, propionitrile, aminopropionitrile, methylaminopropionitrile, iminodipropionitrile, butylonitrile, methylbutenitrile, butanentrile, methylethyl ether, diethyl ether, methylphenylether, ethylphenylether, dimethoxybenzene, trimethoxybenzene, methoxyphenol, tetrahydrofuran, methyltetrahydrofuran, dioxane, chloromethane, chloromethane, chloromethane, dibenzene, and the like which are all polar and exhibit a low solubility for a metal salt catalyst.

In addition, the molar ratio of the polar aprotic solvent to the repeating units of the raw material polymer having the ester functional group is in the range of from 0.1 to 5,000 and preferably in the range of from 1 to 500.

The depolymerization method for the polymer having the ester functional group, according to the present disclosure, may further include a step of removing moisture from one or more materials selected from among the alcohol, the potassium carbonate, the polar aprotic solvent, and the polymer having the ester functional group, which are all raw materials for the depolymerization reaction. In addition, when there are more raw materials such as additives that can be included in the depolymerization reaction system, a step of removing moisture from these raw materials can also be included.

This is because in the commercial process of preparing a monomer from a waste polymer having an ester functional group, moisture can be introduced into the reactor through various routes and can affect the selectivity of the targeted end product. In particular, in the process of washing waste plastic discarded after use, a large quantity of moisture trapped in the free volume of the polymer chain may be directly involved in in the reaction. Under elevated temperature conditions, the catalyst promotes the rate of the hydrolysis reaction, and thus irreversible by-products (hydrolysis products) are inevitably generated. In order to design an effective reaction process, it is necessary to reduce the amount of compounds used (for example, solvent and catalyst), to improve the degradation rate of polymers having ester functional groups, and to effectively inhibit a hydrolysis reaction which is a side reaction route to improve the selectivity of alcoholysis monomer products. However, the method of selectively applying a highly selective polar solvent to the primary reaction (i.e., alcoholysis) has a very limited effect, and has many constraints of cost efficiency, process configuration, and working conditions.

However, in the depolymerization method according to the present disclosure, even though a large amount of moisture is present in the raw materials, since the hydrolysis proceeds more slowly in terms of the reaction rate than methanolysis, it is possible to considerably increase the selectivity of the methanolysis reaction by preliminarily removing the moisture from the raw materials or by adding a material that adsorb or absorb the moisture at a much faster rate than the hydrolysis rate.

Accordingly, the moisture removal from the raw materials to be used for the depolymerization may be performed prior to the polymer depolymerization reaction or may be performed in parallel with the polymer depolymerization reaction.

For example, the raw material polymer may be dried under atmospheric pressure or vacuum pressure. Alternatively, the moisture may be removed by adding a moisture-removing material to an alcohol or polar aprotic solvent used for the reaction. In this case, the moisture-removing material may be filtered before use or may be used in the polymer degradation reaction without being filtered. Further alternatively, the moisture-removing material may be added the mixture in which all the raw materials are mixed to remove the moisturized contained in the raw materials.

In this case, the moisture-removing material is required to exhibit a selective adsorption or absorption effect only on moisture within the reaction temperature range, to prevent the moisture desorption or release from being dominant, and not to exhibit a negative effect on the alcoholysis. Examples of the moisture-removing material include, but are not limited to, molecular sieves, silica gels, metal-organic frameworks (MOFs), metal-containing absorbents such as Na, $Na_2SO_4$, KOH, Ca, CaO, $CaC_2$, $CaH_2$, Mg, $MgSO_4$, BaO, and hygroscopic polymer resins. Commonly known absorbents or adsorbents may be used.

The depolymerization method for waste polymer having an ester functional group, according to the present disclosure provides a method of rapidly depolymerizing the polymer through alcoholysis depolymerization a temperature in the range of from 0° C. to 100° C. and preferably the range of from 10° C. to 80° C.

As a result, in some exemplary depolymerization methods for polymers having ester functional groups, proposed in the description of the present disclosure, complete polymer degradation can be induced at near atmospheric pressure and near room temperature. In addition, the reaction system is constructed to have a simple structure, resulting in much lower investment costs compared to conventional techniques or existing processes. In addition, efficient and stable energy management are possible. On the other hand, since the depolymerization technology according to the present disclosure uses a water-soluble, heterogeneous, inexpensive catalyst, it is easy to recover and reuse the catalyst after the reaction, In addition, since the reaction temperature of the reactant itself is lowered to below room temperature, the monomers produced by the reaction can be recovered at a high recovery rate. In addition, since the solvents used can be reintroduced into the process as the raw materials for depolymerization raw materials, it is possible to improve the economics of the recycling process.

In the polymer depolymerization method described above, sufficient energy required for depolymerization only from mixing heat, dissolution heat, etc. that occur during the preparation of a mixture solution for a polymerization reaction. Therefore, the method does not require inputting additional heat sources in the depolymerization process. In this case, the depolymerization may be performed in an adiabatic reactor. In addition, as with some examples of the present disclosure, depolymerization may be performed while using an external heat source.

In addition, the polymer depolymerization may be performed at atmospheric pressure or higher. Specifically, it may be performed at a pressure in the range of from 1 atm to about 6.5 atm.

In addition, the polymer depolymerization may be performed in an open system exposed to the ambient air or a closed system. Alternatively, the depolymerization may be performed by refluxing the solvent using a condenser.

The composition of each of the catalysts and reactants described herein has the advantages of providing high reactivity, effectively controlling impurities, and reducing energy consumption compared to the existing processes. Therefore, there is provided a method being capable of significantly improving the performance efficiency of methanolysis, increasing the yield of the product, considerably reducing the energy and operating cost, and producing high value-added high-purity monomers.

In addition, by the methods described herein, at least a portion of the polymer used in the reaction can be converted into a high quality level of monomers that can be reused as a raw material for the preparation of a fresh polymer material in a polymer preparation process. The reaction time for depolymerization may vary depending on the amount of polymer used. However, in the case of performing a reaction at room temperature without any external energy input, a sufficiently high yield of monomer can be obtained within 24 hours. In addition, since materials other than the reactants do not undergo serious chemical changes, most of the materials can be recovered and reused in the process.

In the case of reaction combinations according to some examples herein, the reaction may be performed at a temperature higher than room temperature to shorten the depolymerization reaction time. The complete degradation by the depolymerization of the polymer comprising the ester functional group may end within 3 hours of reaction.

The depolymerization method of the present disclosure may further includes a process of separating and removing unreacted polymers, by-products, insoluble catalysts, and the like from the reaction mixture solution resulting from the depolymerization reaction by filtering out solids that are not dissolved in the solution.

In addition, the present disclosure provides a method of purifying monomers obtained through the depolymerization of the polymer having the ester functional group.

The purification method includes: adding an acid or ion exchange resin to the reaction mixture solution including the monomers obtained by the depolymerization method to induce inactivation of the catalyst; and separating or recovering a portion of or the entirety of the solvent used in the depolymerization by one or an arbitrary combination of filtration, distillation, evaporation, drying, and extraction.

In the separation or recovery of the solvent, the separation process such as filtration, distillation, evaporation, drying, and extraction may be performed in one or more divided steps.

In addition, after separating or recovering a portion or entity of the solvent used in the polymerization process by one or a combination of filtration, distillation, evaporation, drying, and extraction from the reaction mixture solution including the monomers obtained by the depolymerization method of the present disclosure, an excessive amount of deionized water may be added to the remaining solution, and the solution is left intact at a temperature below room temperature for a long period of time. By this step, recrystallization of DMT, which is a monomer, occurs. Next, a physical separation process such as filtration, evaporation, and drying is performed to collect the target product. In the filtration step, deionized water can be added to a filter cake for additional cleaning, and the resulting moisturized samples can be collected as the targeted end product through solvent drying using evaporation or distillation.

An inorganic acid may be added to the filtrate so that the components in the filtrate are precipitated as salts, and monomers such as mono-methyl terephthalate (MMT) and terephthalic acid (TPA) may be recovered as byproducts. Instead of the filtration of the reaction mixture, the reaction mixture may be centrifuged to be separated into a liquid phase and a solid phase.

The present disclosure provides a polymer depolymerization composition for a polymer having an ester functional group. The composition includes (1) an alcohol, (2) potassium carbonate ($K_2CO_3$) serving as a catalyst, and (3) a polar aprotic solvent. By contacting this composition with a polymer having an ester functional group, the polymer can be easily degraded even at low temperature through an exchange esterification reaction.

Hereinafter, the details of the present disclosure will be described with reference to examples and comparative examples. It is noted that the examples and comparative examples are presented only for illustrative purposes and are not intended to limit the scope of the present disclosure.

Raw Material 1 (Raw Material Polymer having Ester Functional Group)

As a polymer material having an ester functional group, waste bottles made of polyethylene terephthalate were crushed into flake chips having an area of 1 cm$^2$ or less.

Example 1

Per 1 g of a raw material polymer prepared according to Raw Material 1, 22.1 g (equivalent to the number of moles, which is 50 times the number of moles of the repeating unit of the raw material polymer) of dichloromethane (Samchun Chemicals Co., Ltd.; purity 99.5%), 8.32 g (equivalent to the number of moles of methanol, which is 50 times the number of moles of the repeating unit of the raw material polymer) of methanol (Samchun Chemicals Co., Ltd.; 99.9%), and 0.144 g (equivalent to the number of moles of potassium carbonate, which 0.2 times the number of moles of the repeating unit of the raw material polymer) of K$_2$CO$_3$ (potassium carbonate; Sigma-Aldrich, ACS reagent) as catalyst were added to a 50 ml reactor. In addition, secondary distilled water was added thereto to adjust the initial moisture content in the reactant. The initial moisture content was 0.4 moles relative to 1 mole of the repeating unit of the raw material polymer. A magnetic stirrer was used to stir the mixture at 500 rpm at 25° C. at atmospheric pressure for 24 hours.

After the reaction, the reaction mixture was primary filtered and separated into a primary filtrate and an insoluble solid phase. The primary filtrate contained an organic solvent, a portion of K-MMT, which is a potassium salt of dimethyl terephthalate (DMT), 1-(2-hydroxyethyl)4-methyl terephthalate (HEMT), ethyleneglycol, and monomethyl-terephthalate (MMT), etc. The insoluble solid phase included mainly unreacted PET, K$_2$CO$_3$ catalyst, and potassium salts K-MMT and K-TPA of monomethyl terephthalate (MMT) and terephthalic acid (TPA), etc.

A trace amount (50 mg or less) of the primary filtrate was collected and prepared as a sample. The distribution and concentration of each component of the sample were analyzed using a high-performance liquid chromatography (HPLC, Younglin YL 3000 with C$_{18}$ column (250×4.5 mm) and a UV detector (λ=254 nm)). For the HPLC analysis, a mixed solution in which methanol and water were mixed in a volume ratio of 70:30 was used as a mobile phase, and the total flow rate was maintained at 0.7 ml/min.

Most of the solvents (dichloromethane and methanol) contained in the primary filtrate (a) prepared in advance were removed using a rotary evaporator. The composition of the mixture from which the solvents had been removed by evaporation was diluted with the mobile phase solvent and quantitatively analyzed by HPLC, and it was confirmed that the loss of the monomer (DMT) did not occur.

Distilled water was added to the primary filtrate (a), and preserved at a temperature of 4° C. or below for 12 hours. The resulting precipitate was collected through filtration and dried. As a result, white crystalline particles 1 (Sample 1) were obtained.

The process described above was repeated to prepare a filtrate (a). Hydrochloric acid (35%, Sigma-Aldrich) in an amount corresponding to the molar equivalent of K$_2$CO$_3$ initially added for the reaction was added to the filtrate (a), and the mixture was stirred at 500 rpm for 2 hours using a magnetic stirrer to obtain a sample (b).

The process described above was repeated to prepare a filtrate (a). Next, 100 mg of cation exchange resin (Sigma-Aldrich, Amberlyst 15, dry form) was added to the filtrate (a). The mixture was stirred at 500 rpm for 2 hours using a magnetic stirrer, and the ion exchange resin was extracted to prepare a sample (c) to be purified.

Each of the samples (b) and (c) was heated to 150° C. under vacuum conditions (≤1 torr), and then products having a low boiling point were separated into distillates through simple distillation. The obtained distillates were washed with distilled water and dried at 80° C. for 24 hours using a vacuum dryer. Thus, white crystalline particles were obtained as Sample 2 and Sample 3.

The Samples (white crystalline particles) 1 to 3 were quantitatively analyzed by HPLC. The results for the all of the samples revealed that high-purity DMT (purity>99.9%) was obtained.

Water was added to the insoluble solid phase collected through the primary filtration, and the resulting mixture was secondarily filtered to collect unreacted polyethylene terephthalate. A hydrochloric acid aqueous solution was added to the secondary filtrate to respectively convert K-MMT and K-TPA into MMT and TPA. The exact chemical structure of each of the TPA and MMT was identified by $^1$H-NMR, EI-MS, etc., and the purity was determined by HPLC.

The conversion rate of PET, the yield of DMT, the yield of HEMT, the yield of TPA, and the yield of MMT were calculated using the formulas described below.

$$PET \text{ conversion rate} = (M_o - M)/M_o \qquad \text{(Formula 1)}$$

$$DMT \text{ yield} = \left(N_{DMT}/N_o\right) \times 100\% \qquad \text{(Formula 2)}$$

$$HEMT \text{ yield} = \left(N_{HEMT}/N_o\right) \times 100\% \qquad \text{(Formula 3)}$$

$$MMT \text{ yield} = \left(N_{MMT}/N_o\right) \times 100\% \qquad \text{(Formula 4)}$$

$$TPA \text{ yield} = \left(N_{TPA}/N_o\right) \times 100\% \qquad \text{(Formula 5)}$$

In the above formulas, $M_o$ is the mass of initial feedstock polymer, M is the mass of unreacted polymer, $N_o$ is the number of moles of repeating units of initial feedstock polymer (PET), and $N_{DMT}$, $N_{HEMT}$, $N_{MNT}$, and $N_{TPA}$ are the numbers of moles of DMT, HEMT, MMT, and TPA produced, respectively.

A trace amount (50 mg or less) of the reaction mixture was sampled for each time period during the reaction, the collected reaction mixture was 1000-fold diluted with a mixed solution having the same composition as the HPLC mobile phase to prepare an analysis sample. HPLC was used to quantitatively analyze the concentration of each product, and the polymer conversion rate and the yield of each product were calculated.

Example 2

Depolymerization and evaluation were performed in the same manner as in Example 1, except that 15.09 g (equivalent to the number of moles of acetone, which is 50 times the number of moles of the repeating unit of the raw material polymer) of acetone was used per 1 g of the raw material polymer instead of dichloromethane which was used in Example 1.

Example 3

Depolymerization and evaluation were performed in the same manner as in Example 1, except that 10.67 g (equivalent to the number of moles of acetonitrile, which is 50 times the number of moles of the repeating unit of the raw material polymer) of acetonitrile was used per 1 g of the raw material polymer instead of dichloromethane which was used in Example 1.

Example 4

Depolymerization and evaluation were performed in the same manner as in Example 1, except that 18.75 g (equivalent to the number of moles of tetrahydrofuran, which is 50 times the number of moles of the repeating unit of the raw material polymer) of tetrahydrofuran was used per 1 g of the raw material polymer instead of dichloromethane which was used in Example 1.

Example 5

Depolymerization and evaluation were performed in the same manner as in Example 1, except that 31.03 g (equivalent to the number of moles of chloroform, which is 50 times the number of moles of the repeating unit of the raw material polymer) of chloroform was used per 1 g of the raw material polymer instead of dichloromethane which was used in Example 1.

Example 6

Depolymerization and evaluation were performed in the same manner as in Example 1, except that 29.26 g (equivalent to the number of moles of chlorobenzene, which is 50 times the number of moles of the repeating unit of the raw material polymer) of chlorobenzene was used per 1 g of the raw material polymer instead of dichloromethane which was used in Example 1.

Example 7

Depolymerization and evaluation were performed in the same manner as in Example 6, except that 43.89 g (equivalent to the number of moles of chlorobenzene, which is 75 times the number of moles of the repeating unit of the raw material polymer) of chlorobenzene was used per 1 g of the raw material polymer.

Example 8

Depolymerization and evaluation were performed in the same manner as in Example 6, except that 0.216 g (equivalent to the number of moles of $K_2CO_3$, which is 0.3 times the number of moles of the repeating unit of the raw material polymer) of $K_2CO_3$ was used per 1 g of the raw material polymer.

Example 9

Depolymerization and evaluation were performed in the same manner as in Example 6, except that 0.5 g of the raw material polymer prepared according to Raw Material 1 was used. (In this case, the number of moles of the solvent was 100 times the number of moles of the repeating unit of the raw material polymer, and the number of moles of the catalyst was 0.4 times the number of moles of the repeating unit of the raw material polymer.)

Example 10

Depolymerization and evaluation were performed in the same manner as in Example 4, except that 0.5 g of the raw material polymer prepared according to Raw Material 1 was used. (In this case, the number of moles of the solvent was 100 times the number of moles of the repeating unit of the raw material polymer, and the number of moles of the catalyst was 0.4 times the number of moles of the repeating unit of the raw material polymer.)

Example 11

Depolymerization and evaluation were performed in the same manner as in Example 1, except that 0.5 g of the raw material polymer prepared according to Raw Material 1 was used, and 28.11 g of anisole was used instead of dichloromethane. (In this case, the number of moles of the solvent was 100 times the number of moles of the repeating unit of the raw material polymer, and the number of moles of the catalyst was 0.4 times the number of moles of the repeating unit of the raw material polymer.)

Example 12

Depolymerization and evaluation were performed in the same manner as in Example 1, except that 0.5 g of the raw material polymer prepared according to Raw Material 1 was used, and 23.95 g of toluene was used instead of dichloromethane. (In this case, the number of moles of the solvent was 100 times the number of moles of the repeating unit of the raw material polymer, and the number of moles of the catalyst was 0.4 times the number of moles of the repeating unit of the raw material polymer.)

Example 13

Depolymerization and evaluation were performed in the same manner as in Example 1, except that 6.66 g (equivalent to the number of moles of methanol, which is 40 times the number of moles of the repeating unit of the raw material polymer) of methanol was used per 1 g of the raw material polymer.

Example 14

Depolymerization and evaluation were performed in the same manner as in Example 1, except that 5.00 g (equivalent to the number of moles of methanol, which is 30 times the number of moles of the repeating unit of the raw material polymer) of methanol was used per 1 g of the raw material polymer.

Example 15

Depolymerization and evaluation were performed in the same manner as in Example 1, except that 3.33 g (equivalent to the number of moles of methanol, which is 20 times the number of moles of the repeating unit of the raw material polymer) of methanol was used per 1 g of the raw material polymer.

Example 16

Depolymerization and evaluation were performed in the same manner as in Example 1, except that 1.67 g (equivalent to the number of moles of methanol, which is 10 times the number of moles of the repeating unit of the raw material polymer) of methanol was used per 1 g of the raw material polymer.

US 12,606,689 B2

15

Example 17

Depolymerization and evaluation were performed in the same manner as in Example 1, except that 17.68 g (equivalent to the number of moles of dichloromethane, which is 40 times the number of moles of the repeating unit of the raw material polymer) of dichloromethane was used per 1 g of the raw material polymer.

Example 18

Depolymerization and evaluation were performed in the same manner as in Example 1, except that 13.26 g (equivalent to the number of moles of dichloromethane, which is 30 times the number of moles of the repeating unit of the raw material polymer) of dichloromethane was used per 1 g of the raw material polymer.

Example 19

Depolymerization and evaluation were performed in the same manner as in Example 1, except that 8.84 g (equivalent to the number of moles of dichloromethane, which is 20 times the number of moles of the repeating unit of the raw material polymer) of dichloromethane was used per 1 g of the raw material polymer.

Example 20

Depolymerization and evaluation were performed in the same manner as in Example 1, except that 4.42 g (equivalent to the number of moles of dichloromethane, which is 10 times the number of moles of the repeating unit of the raw material polymer) of dichloromethane was used per 1 g of the raw material polymer.

Example 21

Depolymerization and evaluation were performed in the same manner as in Example 1, except that 0.072 g (equivalent to the number of moles of $K_2CO_3$, which is 0.1 times the number of moles of the repeating unit of the raw material polymer) of $K_2CO_3$ was used per 1 g of the raw material polymer.

Example 22

Depolymerization and evaluation were performed in the same manner as in Example 1, except that 0.108 g (equivalent to the number of moles of $K_2CO_3$, which is 0.15 times the number of moles of the repeating unit of the raw material polymer) of $K_2CO_3$ was used per 1 g of the raw material polymer.

Example 23

Depolymerization and evaluation were performed in the same manner as in Example 1, except that 0.216 g (equivalent to the number of moles of $K_2CO_3$, which is 0.3 times the number of moles of the repeating unit of the raw material polymer) of $K_2CO_3$ was used per 1 g of the raw material polymer.

Example 24

Depolymerization and evaluation were performed in the same manner as in Example 1, except that 0.359 g (equivalent to the number of moles of $K_2CO_3$, which is 0.5 times the number of moles of the repeating unit of the raw material polymer) of $K_2CO_3$ was used per 1 g of the raw material polymer.

Example 25

Depolymerization and evaluation were performed in the same manner as in Example 1, except that 0.503 g (equivalent to the number of moles of $K_2CO_3$, which is 0.7 times the number of moles of the repeating unit of the raw material polymer) of $K_2CO_3$ was used per 1 g of the raw material polymer.

Example 26

Depolymerization and evaluation were performed in the same manner as in Example 1, except that 0.719 g (equivalent to the number of moles of $K_2CO_3$, which is 1.0 times the number of moles of the repeating unit of the raw material polymer) of $K_2CO_3$ was used per 1 g of the raw material polymer.

Example 27

Depolymerization and evaluation were performed in the same manner as in Example 1, except that the reaction temperature was set to 10° C. In this case, the reaction time was 24 hours. The DMT yield was measured for each unit time during the reaction. The results are shown in FIG. 2.

Example 28

Depolymerization and evaluation were performed in the same manner as in Example 27, except that the reaction temperature was set to 15° C. In this case, the reaction time was 24 hours. The evaluation results are shown in FIG. 2.

Example 29

Depolymerization and evaluation were performed in the same manner as in Example 27, except that the reaction temperature was set to 20° C. In this case, the reaction time was 24 hours. The evaluation results are shown in FIG. 2.

Example 30

Depolymerization and evaluation were performed in the same manner as in Example 27, except that the reaction temperature was set to 30° C. In this case, the reaction time was 24 hours. The evaluation results are shown in FIG. 2.

Example 31

Depolymerization and evaluation were performed in the same manner as in Example 27, except that the reaction temperature was set to 35° C. In this case, the reaction time was 24 hours. The evaluation results are shown in FIG. 2.

Example 32

Depolymerization for 9 hours and evaluation were performed in the same manner as in Example 1, except that the reaction temperature was set to 60° C., and 29.26 g of chlorobenzene was used per 1 g of the raw material polymer instead of dichloromethane.

Example 33

Depolymerization for 9 hours and evaluation were performed in the same manner as in Example 32, except that 18.75 g of THF was used per 1 g of the raw material polymer instead of chlorobenzene.

Example 34

Depolymerization for 9 hours and evaluation were performed in the same manner as in Example 32, except that 22.90 g of 1,4-dioxane was used per 1 g of the raw material polymer instead of chlorobenzene.

Example 35

Depolymerization for 6 hours, depolymerization for 9 hours, and evaluation were performed in the same manner as in Example 32, except that 28.11 g of anisole was used per 1 g of the raw material polymer instead of chlorobenzene.

Example 36

Depolymerization for 9 hours and evaluation were performed in the same manner as in Example 32, except that 23.95 g of toluene was used per 1 g of the raw material polymer instead of chlorobenzene.

Example 37

Depolymerization and evaluation were performed by changing the conditions of Example 1. Instead of adding water to the reactant, 33 g of a molecular sieve (Sigma-Aldrich, MS 3 Å beads, 4-8 mesh) were added per 1 g of the raw material polymer prepared according to Raw Material 1. Methanol 3 g (equivalent to the number of moles of methanol, which is 18 times the number of moles of repeating unit of the raw material polymer), dichloromethane 3 g (equivalent to the number of moles of dichloromethane, which is about 6.8 times the number of moles of the repeating unit of the raw material polymer), and $K_2CO_3$ 0.07 g (equivalent to the number of moles of $K_2CO_3$, which is 0.1 times the number of moles of the repeating unit of the raw material polymer) as a catalyst were added to a 50 ml high pressure reactor. The reaction was carried out with stirring at 500 rpm for 2 hours at 60° C.

Example 38

Depolymerization and evaluation were performed in the same manner as in Example 37, except that 6 g (equivalent to the number of moles of dichloromethane, which is 13.6 times the number of moles of the repeating unit of the raw material polymer) of dichloromethane was used per 1 g of the raw material polymer.

Example 39

Depolymerization and evaluation were performed in the same manner as in Example 37, except that 9 g (equivalent to the number of moles of dichloromethane, which is 20.3 times the number of moles of the repeating unit of the raw material polymer) of dichloromethane was used per 1 g of the raw material polymer.

Example 40

Depolymerization and evaluation were performed in the same manner as in Example 37, except that 12 g (equivalent to the number of moles of dichloromethane, which is 27 times the number of moles of the repeating unit of the raw material polymer) of dichloromethane was used per 1 g of the raw material polymer.

Example 41

Depolymerization and evaluation were performed in the same manner as in Example 38, except that 100 mg of $Na_2SO_4$ was used per 1 g of the raw material polymer instead of the molecular sieve.

Example 42

In this example, the order of addition of reactants was changed from the order in Example 38. 3 g of methanol and about 33 mg of a molecular sieve were added per 1 g of the raw material polymer prepared according to Raw Material 1 and stirred at 60° C. for 12 hours. After removing only the molecular sieve from the mixture, 12 g of dichloromethane and 0.07 g of $K_2CO_3$ as a catalyst were added. Next, the polymerization and evaluation were performed in the same manner.

Example 43

Depolymerization and evaluation were performed in the same manner as in Example 38, except that the law material polymer prepared according to Raw Material 1 was dried at a temperature of 80° C. and a vacuum level of 3 torr or less for 12 hours to remove moisture, and the molecular sieve was not used.

Comparative Example 1

Depolymerization and evaluation were performed in the same manner as in Example 1, except that 0.073 g (equivalent to the number of moles of $CH_3OK$, which is 0.2 times the number of moles of the repeating unit of the raw material polymer) of $CH_3OK$ was added instead of the $K_2CO_3$ catalyst.

Comparative Example 2

Depolymerization and evaluation were performed in the same manner as in Example 1, except that 0.145 g (equivalent to the number of moles of triazabicyclodence, which is 0.2 times the number of moles of the repeating unit of the raw material polymer) of triazabicyclodence (TBD) was used as a catalyst.

Comparative Example 3

Depolymerization and evaluation were performed in the same manner as in Example 1, except that 0.110 g (equivalent to the number of moles of $Na_2CO_3$, which is 0.2 times the number of moles of the repeating unit of the raw material polymer) of $Na_2CO_3$ was used.

Comparative Example 4

Depolymerization and evaluation were performed in the same manner as in Example 1, except that 0.087 g (equivalent to the number of moles of $NaHCO_3$, which is 0.2 times the number of moles of the repeating unit of the raw material polymer) of $NaHCO_3$ was used.

Comparative Example 5

Depolymerization and evaluation were performed in the same manner as in Example 1, except that 0.085 g (equivalent to the number of moles of $CH_3COONa$, which is 0.2 times the number of moles of the repeating unit of the raw material polymer) of $CH_3COONa$ was used.

Comparative Example 6

Depolymerization and evaluation were performed in the same manner as in Example 1, except that 0.104 g (equivalent to the number of moles of $KHCO_3$, which is 0.2 times the number of moles of the repeating unit of the raw material polymer) of $KHCO_3$ was used.

Comparative Example 7

Depolymerization and evaluation were performed in the same manner as in Example 1, except that 0.103 g (equivalent to the number of moles of $CH_3COOK$, which is 0.2 times the number of moles of the repeating unit of the raw material polymer) of $CH_3COOK$ was used.

Comparative Example 8

Depolymerization and evaluation were performed in the same manner as in Example 1, except that 0.088 g (equivalent to the number of moles of $MgCO_3$, which is 0.2 times the number of moles of the repeating unit of the raw material polymer) of $MgCO_3$ was used.

Comparative Example 9

Depolymerization and evaluation were performed in the same manner as in Example 1, except that 0.1040 g (equivalent to the number of moles of $CaCO_3$, which is 0.2 times the number of moles of the repeating unit of the raw material polymer) of $CaCO_3$ was used.

Comparative Example 10

Depolymerization and evaluation were performed in the same manner as in Example 1, except that 0.0583 g (equivalent to the number of moles of CaO, which is 0.2 times the number of moles of the repeating unit of the raw material polymer) of CaO was used.

Comparative Example 11

Depolymerization and evaluation were performed in the same manner as in Example 1, except that dichloromethane was not used.

Comparative Example 12

Depolymerization and evaluation were performed in the same manner as in Example 1, except that 21.88 g (equivalent to the number of moles of n-heptane, which is 50 times the number of moles of the repeating unit of the raw material polymer) of n-heptane was used per 1 g of the raw material polymer instead of dichloromethane.

Comparative Example 13

Depolymerization and evaluation were performed in the same manner as in Example 1, except that 26.05 g (equivalent to the number of moles of cyclohexane, which is 50 times the number of moles of the repeating unit of the raw material polymer) of cyclohexane was used per 1 g of the raw material polymer instead of dichloromethane.

Comparative Example 14

Depolymerization and evaluation were performed in the same manner as in Comparative Example 1, except that 0.146 g (equivalent to the number of moles of $CH_3OK$, which is 0.4 times the number of moles of the repeating unit of the raw material polymer) of $CH_3OK$ was used.

Comparative Example 15

Depolymerization and evaluation were performed in the same manner as in Example 38, except that no molecular sieve was used.

[Methanolysis Reaction Characteristics Depending on Selection of Reaction Catalyst]

Comparative Example 1 is intended to evaluate the performance of a methanolysis reaction of a polyethylene terephthalate with the addition of alkali methoxide ($CH_3OK$), which is disclosed as one example in Patent Document 2 (Korean Patent Application Publication No. 10-2020-0093525), by comparing with the performance of one example of the present disclosure. Comparative Example 2 is intended to evaluate the performance of a methanolysis reaction of a polyethylene terephthalate using 1,5,7-triazabicyclo[4.4.0]dec-5-ene (TBD), which is an exemplary organic catalyst disclosed in Patent Document 3 (U.S. Pat. No. 8,309,618), as a catalyst by comparing with the performance of a methanolysis reaction performed under the same conditions as in one example of the present disclosure except for the absence of a catalyst.

Example 1 is an example presented to describe the performance and effect of the methanolysis of the present disclosure. In Example 1, potassium carbonate ($K_2CO_3$) was added as a catalyst, and DCM, which is a polar solvent, was added to construct a reaction system. Under the conditions, the depolymerization of polyethylene terephthalate was performed.

In a reaction system (Comparative Example 2) in which both methoxy potassium (Comparative Example 1) and TBD are added as catalysts, methoxy potassium and TBD are uniformly dissolved in a mixture composed of methanol and solvents, and are present in a liquid phase along with the depolymerization reactants after the reaction.

On the other hand, when potassium carbonate ($K_2CO_3$) is used as a catalyst according to one example of the present disclosure, since potassium carbonate has a very limited solubility in a number of organic solvents including methanol, it may exist in the form of a mostly heterogeneous solid phase.

Table 1 shows comparison of reaction performance between the cases where different catalysts are used under the conditions in which DCM, which is a non-polar aprotic solvent, is added, and the methanolysis depolymerization of polyethylene terephthalate is performed for 24 hours at 25° C. Methoxy potassium (Comparative Example 1) and TBD (Comparative Example 2) were used as catalysts (0.2 mole of catalyst per unit mole of monomer), and methanolysis depolymerization was performed at 25° C. for 24 hours, resulting in complete degradation of the polymer. It was observed that the DMT yields were as high as 85.5% and 89.3%, respectively. On the other hand, the concentration of HEMT, which is an intermediate product, was observed to be more than 1%, and the mass of MMT, which is a primary by-product MMT, was as high as 12.3% and 9.21% for both cases, respectively.

On the other hand, in the case of Example 1 in which potassium carbonate ($K_2CO_3$) was used as a catalyst under the same conditions as in the comparative example, DMT was obtained at a relatively high yield of 93.1% compared to the two comparative examples described above, but the yield of MMT, which was the major impurity, was observed to be relatively low.

On the other hand, in glycolysis reactions using ethylene glycol as a reactant, it is common that dimers or oligomers are observed in some concentrations. However, but identifiable amounts of dimers and oligomers were not detected in all of the examples and comparative examples of the present disclosure in which the depolymerization was performed by a methanolysis reaction pathway.

Figure 1:
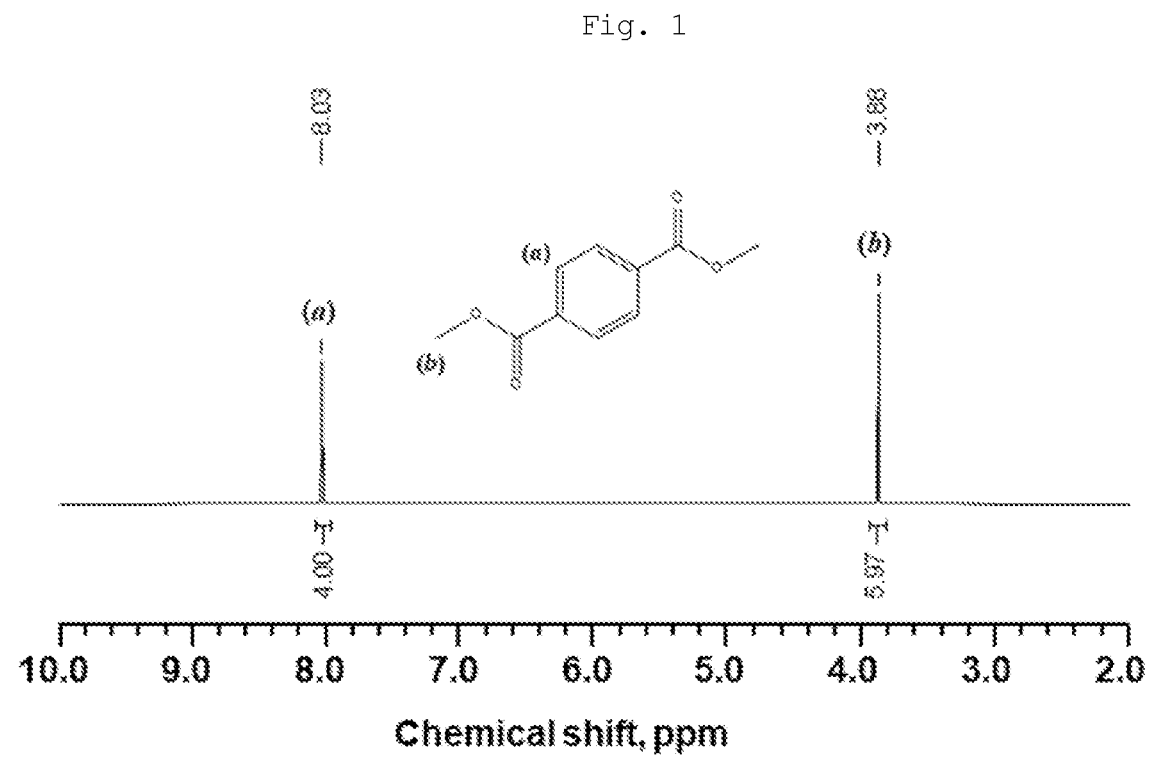

The $^1$H-NMR spectrum for a methanolysis monomer product (DMT) obtained through the reaction of Example 1 and additional washing is shown in FIG. 1. The following peaks were observed.

$^1$H-NMR (400 MHz, $CDCl_3$) δ (ppm): 8.03 (s, 4H), 3.88 (s, 6H)

TABLE 1

Methanolysis performance according to catalyst type
(reaction temperature: 25° C., reaction time: 24 hr)

| Ex. # | Type of Catalyst | MeOH | DCM | Catalyst | Conversion rate (%) | DMT | HEMT | MMT |
|---|---|---|---|---|---|---|---|---|
| C. Ex. 1 | CH₃OK | 50 | 50 | 0.2 | 100.0 | 85.52 | 1.40 | 12.29 |
| C. Ex. 2 | TBD | 50 | 50 | 0.2 | 100.0 | 89.34 | 1.27 | 9.21 |
| Ex. 1 | K₂CO₃ | 50 | 50 | 0.2 | 100.0 | 93.12 | 1.50 | 4.73 |

TBD: 1,5,7-Triazabicyclodec-5-ene,
DCM: Dichloromethane,
DMT: Dimethyl terephthalate,
HEMT: 1-(2-Hydroxyethyl)4-methyl terephthalate,
MMT: Mono-Methyl terephthalate or metal cation exchanged form Table 2 below shows the results of experiments using alkaline metal salts and alkaline earth metal salts as catalysts.

Comparative Examples 3 to 8 are examples in which depolymerization was performed with the use of different forms of alkaline metal salts, alkaline earth metal salts, etc. as catalysts instead of potassium carbonate ($K_2CO_3$) which was used as a catalyst in Example 1. The reaction performance comparison between each of the Examples 3 to 8 and Example 1 was performed.

Most of the metal salts exhibited no catalytic activity or nearly no reactivity in PET methanolysis at low temperature (25° C.). However, interestingly, in the case of Example 1 in which potassium carbonate ($K_2CO_3$) was added as a catalyst, high reactivity and high selectivity of monomers generated through the methanolysis reaction pathway of polyethylene terephthalate were observed.

Therefore, the depolymerization reaction system designed according to the present disclosure includes potassium carbonate ($K_2CO_3$) as a catalyst. In the polymerization reaction system according to the present disclosure, most of the catalyst remains as a heterogeneous solid phase after the reaction. Therefore, it is possible to recover the catalyst by physical separation and to return the catalyst into the reaction.

TABLE 2

Catalytic effect of alkaline metal salt and alkaline earth metal salt on
methanolysis reaction (reaction temperature: 25° C., reaction time: 24 hr)

| Ex. # | Type of Catalyst | MeOH | DCM | Catalyst | Conversion rate (%) | DMT | HEMT | MMT |
|---|---|---|---|---|---|---|---|---|
| C. Ex. 3 | Na₂CO₃ | 50 | 50 | 0.2 | 5.67 | 3.15 | 0.47 | 1.50 |
| C. Ex. 4 | NaHCO₃ | 50 | 50 | 0.2 | 1.61 | 1.38 | 0.03 | 0.20 |

TABLE 2-continued

Catalytic effect of alkaline metal salt and alkaline earth metal salt on
methanolysis reaction (reaction temperature: 25° C., reaction time: 24 hr)

| Ex. # | Type of Catalyst | Mole of Cpd. per mole of polymer (PET) repeating unit | | | Conversion rate | Yield (%) | | |
| | | MeOH | DCM | Catalyst | (%) | DMT | HEMT | MMT |
| --- | --- | --- | --- | --- | --- | --- | --- | --- |
| C. Ex. 5 | Na(OAc) | 50 | 50 | 0.2 | 0.00 | 0.00 | 0.00 | 0.00 |
| Ex. 1 | K$_2$CO$_3$ | 50 | 50 | 0.2 | 100.0 | 93.12 | 1.50 | 4.73 |
| C. Ex. 6 | KHCO$_3$ | 50 | 50 | 0.2 | 4.37 | 3.51 | 0.36 | 0.50 |
| C. Ex. 7 | K(OAc) | 50 | 50 | 0.2 | 0.40 | 0.32 | 0.01 | 0.05 |
| C. Ex. 8 | MgCO$_3$ | 50 | 50 | 0.2 | 6.65 | 3.15 | 0.69 | 2.80 |
| C. Ex. 9 | CaCO$_3$ | 50 | 50 | 0.2 | 7.47 | 4.32 | 0.18 | 2.95 |
| C. Ex. 10 | CaO | 50 | 50 | 0.2 | 8.69 | 8.08 | 0.01 | 0.23 |

Na(OAc): CH$_3$COONa,
K(OAc): CH$_3$COOK,
DCM: Dichloromethane,
DMT: Dimethyl terephthalate,
HEMT: 1-(2-Hydroxyethyl)4-methyl terephthalate,
MMT: Mono-Methyl terephthalate or metal cation exchanged form

[Comparison of Depolymerization Reaction Characteristics According to Types of Polar and Non-Polar Solvents Added]

Table 3 shows the results of low-temperature (25° C.) methanolysis performed for comparison of the reactivity of methanol depolymerization of polymers having ester functional groups when polar and non-polar aprotic solvents are added. Except for the solvent addition, the same reaction conditions were applied, and the reaction was carried out using a glass-type batch reactor for 24 hours, and the compound composition was quantified using liquid chromatography calibrated in advance by standard samples, and then the conversion rate and the yield of each product were estimated.

In the case of methanolysis carried out under the conditions in which no solvent was added and methanol and a catalyst were added (Comparative Example 11), it was found that the conversion rate was as low as 4.5% and 3.6% of monomer products were obtained. In Comparative Example 12 and Comparative Example 13, a methanolysis was carried out by adding a non-polar, straight-chain hydrocarbon solvent and n-Heptane and cyclohexane solvents that are saturated cyclic hydrocarbons. Compared to Comparative Example 11 in which no solvent was added, it was observed that the conversion rate was lower and the methanolysis reaction proceeded very little. This is because the addition of a solvent results in an increase in the dilution ratio of the reactant, leading to a decrease in reactivity.

In the case of Examples 1 to 6 in which a polar aprotic solvent is used, it was observed that the reactivity was greatly improved compared to the case where an aprotic solvent is not used (Comparative Example 11) or the case where a non-polar aprotic solvent is used (Comparative Examples 12 and 13). Among polar aprotic solvents, chlorinated organic compounds with very low solubility in water showed relatively high reactivity, and tetrahydrofuran (THF), which is a highly polar cyclic ether compound, was also observed to provide high reactivity and high selectivity.

Except for Example 1 in which DCM was used as a solvent, the methanolysis reaction of PET at room temperature was not completed within 24 hours. However, the complete decomposition of PET was observed when the reaction time was extended.

TABLE 3

Changes in methanolysis performance of PET by addition of polar and non-polar
aprotic solvents (reaction temperature: 25° C., reaction time: 24 hr)

| Ex. # | Type of Solvent | Mole of Cpd. per mole of polymer (PET) repeating unit | | | Conversion rate | Yield (%) | | |
| | | MeOH | DCM | K$_2$CO$_3$ | (%) | DMT | HEMT | MMT |
| --- | --- | --- | --- | --- | --- | --- | --- | --- |
| C. Ex. 11 | — | 50 | — | 0.2 | 4.52 | 3.57 | 0.94 | 0.00 |
| C. Ex. 12 | n-heptane | 50 | 50 | 0.2 | 3.06 | 2.26 | 0.00 | 0.02 |
| C. Ex. 13 | Cyclohexane | 50 | 50 | 0.2 | 2.92 | 2.58 | 0.00 | 0.00 |
| Ex. 1 | DCM | 50 | 50 | 0.2 | 100.0 | 93.12 | 1.50 | 4.73 |
| Ex. 2 | Acetone | 50 | 50 | 0.2 | 24.75 | 16.40 | 1.13 | 7.08 |
| Ex. 3 | Acetonitrile | 50 | 50 | 0.2 | 31.59 | 20.48 | 0.46 | 9.94 |
| Ex. 4 | THF | 50 | 50 | 0.2 | 56.93 | 48.77 | 0.61 | 7.02 |
| Ex. 5 | chloroform | 50 | 50 | 0.2 | 70.02 | 65.59 | 0.82 | 3.06 |
| Ex. 6 | chlorobenzene | 50 | 50 | 0.2 | 58.96 | 48.51 | 0.43 | 9.67 |

THF: Tetrahydrofuran,
DCM: Dichloromethane,
DMT: Dimethyl terephthalate,
HEMT: 1-(2-Hydroxyethyl)4-methyl terephthalate,
MMT: Mono-Methyl terephthalate or metal cation exchanged form

[Comparison of Polymerization Reaction Characteristics According to the Amount of Raw Material Polymer, Solvent and Catalyst Used]

Table 4 shows the results of low-temperature (25° C.) methanolysis performed to observe the reaction character-istics of depolymerization of methanol of the polymers having an ester functional group in the case where some polar aprotic solvents were used and the composition of each added compound was varied. Examples 7 to 8 are examples in which the conditions of PET methanolysis of Example 6 shown in Table 3 were changed. Looking at the results of Example 7 in which the amount of the polar aprotic solvent was 1.5 times larger than that of Example 6, it was observed that the conversion rate was increased by an absolute value of 14.0 or greater and the yield of DMT was increased by an absolute value of 13.7 or greater.

On the other hand, when comparing the results of Example 7 and the results of Example 5 in which chloroform was used as an organic solvent containing chlorine, in the case of Example 7, the conversion rate was higher but the yield of DMT was lower. This means that an appropriate combination of solvents for limiting the monomer product production rate is an important factor in constructing the reaction system to improve the selectivity of a product as well as the reactivity in the polymer depolymerization reaction.

increased, the reactivity is low, but the selectivity to a monomer product may be relatively high. Therefore, when the reaction time is increased to allow sufficient reaction to occur, the yield of a monomer as an end product can be improved. This means that optimization of the reaction can be implemented by controlling the variables.

Example 10 is the case where the amount of the raw material polymer (PET) was reduced compared to Example 4 (see Table 3) in which THF as a polar aprotic solvent was used so that the dilution ratio of the raw material polymer was 2-fold increased. Under the conditions, methanolysis was performed. Unlike the examples of using chlorobenzene described above, in the case of using THF which is an ether compound, as the ratio of the raw material was decreased, the reactivity considerably increased, and the product yield and selectivity were also considerably improved. This explains that the optimal composition of the compound greatly varies depending on the type of a polar aprotic solvent.

On the other hand, when low-temperature methanolysis was performed while using, as a solvent, anisole (methyl phenyl ether) which is an ether compound having an aro-matic ring or toluene which is an aromatic hydrocarbon compound having a very low polarity, the depolymerization rate increased due to the addition of a solvent.

TABLE 4

Changes in PET methanolysis reaction characteristics according to change in composition of a compound (reaction temperature: 25° C., reaction time: 24 hr)

| Ex. # | Type of Polar solvent | Mole of Cpd. per mole of polymer (PET) repeating unit | | | Conver-sion rate | Yield (%) | | |
|---|---|---|---|---|---|---|---|---|
| | | MeOH | solvent | $K_2CO_3$ | (%) | DMT | HEMT | MMT |
| Ex. 4 | THF | 50 | 50 | 0.2 | 56.93 | 48.77 | 0.61 | 7.02 |
| Ex. 5 | Chloroform | 50 | 50 | 0.2 | 70.02 | 65.59 | 0.82 | 3.06 |
| Ex. 6 | Chlorobenzene | 50 | 50 | 0.2 | 58.96 | 48.51 | 0.43 | 9.67 |
| Ex. 7 | Chlorobenzene | 50 | 75 | 0.2 | 73.01 | 62.20 | 0.53 | 10.17 |
| Ex. 8 | Chlorobenzene | 50 | 50 | 0.3 | 78.70 | 64.05 | 0.55 | 13.59 |
| Ex. 9 | Chlorobenzene | 100 | 100 | 0.4 | 45.36 | 41.61 | 0.00 | 3.15 |
| Ex. 10 | THF | 100 | 100 | 0.4 | 89.63 | 82.63 | 0.82 | 5.55 |
| Ex. 11 | Anisole | 100 | 100 | 0.4 | 45.10 | 40.14 | 0.84 | 3.31 |
| Ex. 12 | toluene | 100 | 100 | 0.4 | 38.87 | 34.56 | 0.00 | 4.09 |

THF: Tetrahydrofuran,
Anisole: Methylphenylether,
DMT: Dimethyl terephthalate,
HEMT: 1-(2-Hydroxyethyl)4-methyl terephthalate,
MMT: Mono-Methyl terephthalate or metal cation exchanged form In the case of Example 8 in which the amount of the catalyst was increased to be 1.5 times larger than that of Example 6, it was observed that the yield of a monomeric product was not significantly changed, but the reaction rate was improved.

In the case of Example 9 in which the amount of the raw material polymer (PET) was reduced compared to Example 6, and thus the dilution ratio of the raw material polymer (PET) was increased by 2 times, the reaction rate was considerably lowered (13.6% reduction in conversion rate), and the yield of a monomer product was more moderately decreased. Although the amount of a catalyst is increased, since the amount of methanol and the amount of a polar aprotic solvent are also increased, the dilution ratio of the raw material increases. This results in limiting the conver-sion rate and the product yield of the methanolysis reaction. This means that when the dilution ratio of the solvent is

[Comparison of Depolymerization Reaction Characteristics According to the Amount of Methanol]

Table 5 shows changes in reaction characteristics accord-ing to the content of the reactant methanol in performing the low-temperature (25° C.) methanolysis reaction of a poly-mer having an ester functional group.

When the number of moles of methanol added was reduced to about 80% compared to the compound compo-sition of Example 1, the yield of DMT which was a monomer product was significantly reduced. When it was reduced to 20% or lower (Example 16), the yield of DMT was more significantly reduced. This is the result of indi-cating that a compound composition in which the amount of methanol is excessive is advantageous in terms of obtaining a monomer product in a high yield through the low-tem-perature methanolysis.

TABLE 5

| | | | | Conversion | DMT yield |
|---|---|---|---|---|---|
| Changes in PET methanolysis reaction characteristics according to the content of methanol (reaction temperature: 25° C., reaction time: 24 hr) | | | | | |
| | Mole of Cpd. Per mole of polymer (PET) repeating unit | | | Conversion | DMT yield |
| Ex. # | MeOH | DCM | K$_2$CO$_3$ | rate (%) | (%) |
| Ex. 1 | 50 | 50 | 0.2 | 100.0 | 93.12 |
| Ex. 13 | 40 | 50 | 0.2 | 100.0 | 88.81 |
| Ex. 14 | 30 | 50 | 0.2 | 100.0 | 87.48 |
| Ex. 15 | 20 | 75 | 0.2 | 100.0 | 86.37 |
| Ex. 16 | 10 | 50 | 0.2 | 100.0 | 83.78 |

DCM: Dichloromethane, DMT: Dimethyl terephthalate

[Comparison of Depolymerization Reaction Characteristics According to the Amount of Polar Aprotic Solvent]

Table 6 shows changes in reaction characteristics when the content of a polar aprotic solvent is changed to improve the reactivity of a catalyst in performing the low-temperature (25° C.) methanolysis reaction of a polymer having an ester functional group.

When the number of moles of the polar solvent added is lowered to 80% (Example 17) compared to the compound composition of Example 1, a certain fraction of the polymer that is unreacted in the low-temperature (25° C.) methanolysis reaction performed for 24 hours starts to occur, the yield of the monomer product is significantly lowered. When the number of moles of the polar solvent added is reduced to 50% or lower (Example 19 and Example 20) compared to the composition of Example 1, both the conversion rate and the yield of the monomer product are lowered.

On the other hand, the decrease in the yield of the product is not proportional to the decrease in the conversion rate. This means that the depolymerization reaction is involved in one or more reaction pathways. The rate of monomer decomposition which is a side reaction also affects the overall depolymerization reaction characteristics.

Table 6 indicates that a monomer product can be obtained in a high yield when the number of moles of a polar aprotic solvent added is at or higher than a predetermined level.

TABLE 6

| | | | | Conversion | DMT yield |
|---|---|---|---|---|---|
| Changes in PET methanolysis reaction characteristics according to the added amount of a polar aprotic solvent (reaction temperature: 25° C., reaction time: 24 hr) | | | | | |
| | Mole of Cpd. Per mole of polymer (PET) repeating unit | | | Conversion | DMT yield |
| Ex. # | MeOH | DCM | K$_2$CO$_3$ | rate (%) | (%) |
| Ex. 1 | 50 | 50 | 0.2 | 100.0 | 93.12 |
| Ex. 17 | 50 | 40 | 0.2 | 98.75 | 82.36 |
| Ex. 18 | 50 | 30 | 0.2 | 92.40 | 76.98 |
| Ex. 19 | 50 | 20 | 0.2 | 46.82 | 40.77 |
| Ex. 20 | 50 | 10 | 0.2 | 18.31 | 13.63 |

DCM: Dichloromethane, DMT: Dimethyl terephthalate

[Comparison of Depolymerization Reaction Characteristics According to the Amount of a Catalyst]

Table 7 shows changes in reaction characteristics according to the added amount of a catalyst when performing the low-temperature (25° C.) methanolysis reaction of a polymer having an ester functional group.

The molar ratio of the number of moles of a catalyst that was added, relative to the number of moles of the repeating unit of the polymer (PET) was varied within the range of from 0.1 to 1.0, and the characteristics of the reaction can be inferred from the results of Example 1 and Examples 21 to 26.

In the low-temperature (25° C.) methanolysis reaction over a period of 12 hours, when the molar ratio of the catalyst to the repeating unit of the raw material polymer is 0.5 or greater, most of the polymer was depolymerized, and a monomer was obtained in a high yield.

In the low-temperature (25° C.) methanolysis reaction conducted for 24 hours, the catalyst concentration range exhibiting 100% conversion was expanded, and the progress of depolymerization was observed to be high even when the amount of added catalyst is small. Even after 24 hours of the reaction, when the molar ratio of the added catalyst to the repeating unit of the raw material polymer is 0.15 or less, a certain amount of unreacted polymer was observed. After the end of the reaction, a high fraction of HEMT, which is an intermediate product was relatively high.

In the methanolysis reaction (Example 1 and Examples 23 to 26) carried out under the condition in which the amount of the added catalyst did not exceed 0.15 mole per 1 mole of the repeating unit of the polymer, the complete degradation of the polymer occurred, but there was a large deviation in the yield of the monomer product obtained. For the composition in which the highest yield is obtained, it is seen that there is an optimal point (Example 1) rather than simply increasing or decreasing the amount of added catalyst.

When the catalyst was added in an amount of 0.2 moles per 1 mole of the repeating unit of the polymer, the DMT yield was as high as 93.1% or more, and when the amount of the added catalyst was much smaller than the optimum point (Example 21), the selectivity to the target product was high but the conversion rate was low. Conversely, when the amount of the added catalyst was larger than the optimum point (Example 26), the reactivity was improved but the selectivity was low.

As the amount of catalyst increased, the rate of a side reaction (hydrolysis of the product) was promoted and the product was degraded so that MMT with carboxylic acid rather than a methyl group at the end of the terephthalate functional group was prepared. In the depolymerization carried out for a reaction time of 24 hours under the conditions of Examples 25 and 26 in which a large amount of catalyst was added, an increase in the production of terephthalic acid (TPA) having carboxylic acid at both terminals of the terephthalate functional group was observed. This is the result of explaining that in performing the low temperature (25° C.) methanolysis reaction of a polymer having an ester functional group, the concentration of the catalyst must be maintained at the optimum level to obtain a high yield monomeric product relative to the added raw material.

The unreacted PET in the solid phase recovered after the end of the reaction may be distinguished from the catalyst and the sub-reactants soluble in water. An analysis sample was prepared using a methanol-water mixture (volume ratio of 70:30) so that all the solid phases other than the unreacted PET could be completely dissociated, and the concentrations of potassium carbonate and by-products recovered were quantified using high performance liquid chromatography with the same methanol-water mixture as a mobile phase. It was found that 35% to 90% of the initially input catalyst was present as the potassium carbonate catalyst which could be recovered as a solid phase. The remaining catalyst fraction that was lost relative to the initial input mass was found to have been consumed by cation substitution of terephthalic acid and MMT (by-products) and metal salt formation thereof.

TABLE 7

Changes in PET methanolysis reaction characteristics according to the amount of added catalyst (reaction temperature: 25° C.)

| Ex. # | Rxn. Time (h) | Mole of Cpd. Per mole of polymer (PET) repeating unit | | | Conversion rate (%) | Yield (%) | | | | Cat. (K$_2$CO$_3$) Rec. Rate (%) |
|---|---|---|---|---|---|---|---|---|---|---|
| | | MeOH | DCM | K$_2$CO$_3$ | | DMT | HEMT | MMT | TPA | |
| Ex. 21 | 12 | 50 | 50 | 0.10 | 67.23 | 64.17 | 0.74 | 1.85 | 0.00 | 35.28 |
| | 24 | 50 | 50 | 0.10 | 88.58 | 83.59 | 2.18 | 2.62 | 0.00 | 33.33 |
| Ex. 22 | 12 | 50 | 50 | 0.15 | 72.49 | 69.20 | 0.79 | 2.17 | 0.00 | 41.21 |
| | 24 | 50 | 50 | 0.15 | 93.41 | 87.37 | 2.16 | 3.71 | 0.00 | 51.27 |
| Ex. 1 | 12 | 50 | 50 | 0.20 | 77.74 | 74.19 | 0.82 | 2.46 | 0.00 | 45.29 |
| | 24 | 50 | 50 | 0.20 | 100.0 | 93.12 | 1.50 | 4.73 | 0.00 | 54.84 |
| Ex. 23 | 12 | 50 | 50 | 0.30 | 90.02 | 79.70 | 1.23 | 8.70 | 0.00 | 71.34 |
| | 24 | 50 | 50 | 0.30 | 100.0 | 87.67 | 1.28 | 10.54 | 0.00 | 60.19 |
| Ex. 24 | 12 | 50 | 50 | 0.50 | 97.67 | 86.76 | 1.22 | 9.20 | 0.00 | 74.36 |
| | 24 | 50 | 50 | 0.50 | 100.0 | 84.07 | 1.20 | 14.00 | 0.00 | 67.50 |
| Ex. 25 | 12 | 50 | 50 | 0.70 | 100.0 | 85.33 | 1.09 | 13.04 | 0.00 | 83.76 |
| | 24 | 50 | 50 | 0.70 | 100.0 | 83.22 | 1.19 | 14.15 | 0.67 | 74.60 |
| Ex. 26 | 12 | 50 | 50 | 1.00 | 100.0 | 83.51 | 1.11 | 14.60 | 0.00 | 90.39 |
| | 24 | 50 | 50 | 1.00 | 100.0 | 82.21 | 1.19 | 15.43 | 0.78 | 81.48 |

DCM: Dichloromethane,
DMT: Dimethyl terephthalate,
HEMT: 1-(2-Hydroxyethyl)4-methyl terephthalate,
MMT: Mono-Methyl terephthalate or metal cation exchanged form,
TPA: Terephthalic acid or metal terephthalate

[Comparison of Depolymerization Reaction Rate According to Reaction Temperature Change]

Table 8 shows changes in the decomposition reaction characteristics when the reaction temperature of the reaction system is varied in the PET methanolysis.

The reaction rate was observed while performing the polymerization in the temperature range of 10° C. to 35° C. including room temperature (25° C.) (Example 1), On the other hand, when a condenser is positioned on the top of the reactor to induce refluxing while the reaction was performed with the compound composition described above, the methanolysis can be performed under atmospheric pressure without loss of the solvents in all cases shown in Examples 27 to 31. In the temperature range of 20° C. to 35° C. (Example 1, Examples 29 to 31), no significant change in reactivity was observed, and the behavior for the yield of the product was similar.

In the case of the methanolysis performed at or below a temperature of 15° C., the reaction proceeded much slowly, but it was found that the selectivity of the product was relatively high.

For each example, the yield of DMT according to the reaction time was specifically observed in terms of a reaction rate. The results are shown in FIG. 2. FIG. 2 is a view illustrating changes in yield of a product according to temperatures by sampling the reaction mixture of methanolysis at different times to observe the reaction rate.

It was seen that the reaction progressed rapidly as the temperature increased, and it was observed that the yield of the product slowly decreased after the highest yield was obtained at high temperatures. From this, it can be seen that although the reaction rate is relatively slow, the side reaction in which the product is decomposed continues to proceed. Therefore, when a high temperature is maintained for a long period of time, the yield of the monomer product may continue to decrease. Therefore, when the optimum yield of the monomer is obtained, it may be economically advantageous to deactivate the catalyst or isolate the product to prevent the catalyst system from being involved in the reaction.

Comprehensive comparison of the results of Table 4 to Table 7 provides an idea that various reaction variables affect the reactivity and product yield in the methanolysis according to reaction characteristics that are not simply described herein. The reaction results of the examples reveal that although the temperature is not precisely controlled, if the methanolysis reaction occurs in the range of 20° C. to 35° C., which is near room temperature, the yield of the end product can be estimated within a predetermined error range in the case where the reaction time is sufficiently long. This means that it is possible to obtain a monomer product in a reproducibly high yield by a depolymerization reaction performed with simple stirring, under relatively flexible reaction conditions that do not require energy application or under room temperature conditions unaffected by seasons.

TABLE 8

Changes in PET methanolysis reaction characteristics according to changes in reaction temperature (reaction time: 24 hr)

| Ex. # | Rxn. Temp (° C.) | Mole of Cpd. per mole of polymer (PET) repeating unit | | | Conversion rate (%) | Yield (%) | | |
|---|---|---|---|---|---|---|---|---|
| | | MeOH | DCM | K$_2$CO$_3$ | | DMT | HEMT | MMT |
| Ex. 27 | 10 | 50 | 50 | 0.2 | 64.65 | 63.55 | 0.59 | 0.50 |
| Ex. 28 | 15 | 50 | 50 | 0.2 | 76.91 | 74.02 | 0.94 | 1.35 |

TABLE 8-continued

| | | Mole of Cpd. per mole of polymer (PET) repeating unit | | | Conversion rate | Yield (%) | | |
|---|---|---|---|---|---|---|---|---|
| Ex. # | Rxn. Temp (° C.) | MeOH | DCM | $K_2CO_3$ | (%) | DMT | HEMT | MMT |
| Ex. 29 | 20 | 50 | 50 | 0.2 | 93.74 | 89.65 | 1.24 | 2.75 |
| Ex. 1 | 25 | 50 | 50 | 0.2 | 100.0 | 93.12 | 1.50 | 4.73 |
| Ex. 30 | 30 | 50 | 50 | 0.2 | 100.0 | 91.40 | 1.37 | 6.79 |
| Ex. 31 | 35 | 50 | 50 | 0.2 | 100.0 | 90.36 | 1.38 | 8.26 |

Changes in PET methanolysis reaction characteristics according to changes in reaction temperature (reaction time: 24 hr)

DCM: Dichloromethane,
DMT: Dimethyl terephthalate,
HEMT: 1-(2-Hydroxyethyl)4-methyl terephthalate,
MMT: Mono-Methyl terephthalate or metal cation exchanged form

[Product Selectivity of Methanolysis by Depolymerization Reaction]

Table 9 is prepared to compare changes in depolymerization performance according to ionic equivalents of methoxide potassium which is used in examples disclosed in Patent Document 2 (Korean Patent Application Publication No. 10-2020-0093525) and potassium carbonate, which a heterogeneous catalyst used in examples of the present disclosure.

Methanolysis was performed by adding the same equivalent amount of methoxide metal salt (disclosed in Patent Document 2) to the ionic value of each constituent ion of the catalyst used in Example 1 of the present disclosure, and the evaluation results are expressed as Comparative Example 1 and Comparative Example 14 in Table 9. Here, the catalyst of Example 1, potassium carbonate, is composed of 2 moles on mass transfer, and the depolymerization initially rapidly proceeds due to the reactivity of the compound itself, but the degradation into monomers proceeds rapidly because the side reaction rate is high. This means that as shown in the examples of the present disclosure, the reaction using an inexpensive heterogeneous potassium carbonate catalyst is economical and easier to control the yield of a product compared to the PET methanolysis reaction using methoxide potassium disclosed in Patent Document 2. Therefore, it is expected that the depolymerization method according to the present disclosure is more flexible in operation conditions than the depolymerization method using metal alkoxide. Therefore, the depolymerization method according to the present disclosure can contribute to a high yield production of monomers.

TABLE 9

| | | Mole of Cpd. per mole of polymer (PET) repeating unit | | | Conversion rate | Yield (%) | | | $Cat_{20}$ $(K_2CO_3)$ Rec. Rate |
|---|---|---|---|---|---|---|---|---|---|
| Ex. # | Cat./ Reactant | MeOH | DCM | $K_2CO_3$ | (%) | DMT | HEMT | MMT | (%) |
| C.Ex. 1 | $CH_3OK$ | 50 | 50 | 0.2 | 100.0 | 85.52 | 1.40 | 12.29 | N/A |
| C.Ex. 14 | $CH_3OK$ | 50 | 50 | 0.4 | 100.0 | 81.92 | 0.66 | 16.85 | N/A |
| Ex. 1 | $K_2CO_3$ | 50 | 50 | 0.2 | 100.0 | 93.12 | 1.50 | 4.73 | 54.84 |

Changes in PET methanolysis reaction characteristics according to equivalents of metal salt constituent ions (reaction temperature: 25° C., reaction time: 24 hr)

DCM: Dichloromethane,
DMT: Dimethyl terephthalate,
HEMT: 1-(2-Hydroxyethyl)4-methyl terephthalate,
MMT: Mono-Methyl terephthalate or metal cation exchanged form of cation ($K^+$) per molecule of the salt, and 1 mole of anion (carbonate). Therefore, the equivalents based on the cations are compared with Comparative Example 1, and the equivalents based on the anions are compared with Comparative Example 14.

Similarly to Example 1 in which potassium carbonate was used as a catalyst, in both cases, the conversion was as high as 100% when the reaction was carried out at low temperature (25° C.) for 24 hours, but a much lower yield of the product was observed.

Comparing only the two comparative examples performed by adding potassium methoxide, Comparative Example 14 in which a larger amount of methoxide was used showed a lower DMT yield. Since potassium methoxide is uniformly soluble in methanol, there is almost no restriction According to Patent Document 2, the methoxide metal salt can be prepared by adding an alkaline metal to methanol. Therefore, it is claimed that initiating an in-site reaction by introducing an alkaline metal into a methanolysis reaction using methanol as a reactant is effective.

In the case of causing an in-site reaction by directly adding a methoxide metal salt or an alkaline metal, the methoxide metal salt can be completely or substantially completely dissolved in an excessive amount of methanol or solvent, and thereafter it exists a liquid phase until the end of the reaction.

On the other hand, if no moisture is added to potassium carbonate used as a catalyst according to the present disclosure, most of the potassium carbonate remains in the reaction system as a solid phase, and thus most of the potassium carbonate can be separated and recovered through filtration after the reaction.

In terms of process designing and economics, the prices of candidate materials to be used in the actual reaction, the optimal usage of each material required to secure the operation performance, whether the recovery of the used materials (additives and catalyst) is possible, and whether the recovered materials have sufficient quality to the extent that they can be reused in the process are all important factors. According to one example of the present disclosure, it was confirmed that after the end of the depolymerization reaction performed in a mixture composed of excess anhydrous methanol, a potassium carbonate catalyst, and a polar aprotic solvent, the solid phase was recovered in an amount similar to the initially input mass.

Figure 3:
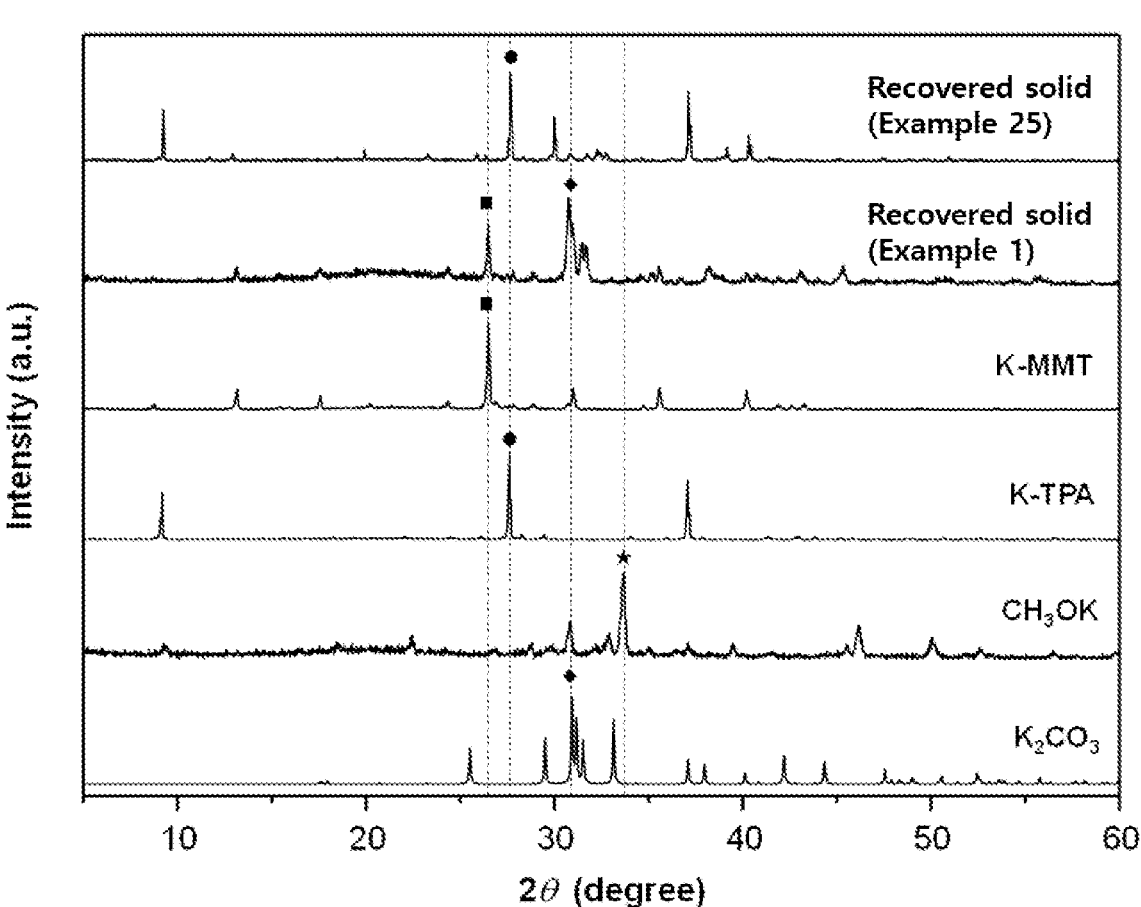
FIG. 3 is a diagram illustrating XRD analysis results of a catalyst that can be used to perform methanolysis of PET according to an example of the present disclosure, a by-product generated through the reaction, and a solid phase recovered after the reaction.

FIG. 3 is an XRD analysis result for samples of an equal amount (mass), the results including the amount of a potassium carbonate catalyst, the amount of a methoxide potassium, the amount of a byproduct of PET methanolysis, and the amount of a solid phase recovered after the methanolysis reaction.

The solid recovered after the reaction was measured by drying the filtered solid after the reaction performed according to Example 1 and Example 22 (0.2 mole and 0.7 mole of potassium carbonate catalyst per mole of repeating unit of polymer (PET), respectively).

In the solid phase obtained from Example 22 in which excess catalyst is used, terephthalic acid (K-TPA) formed by words, the peak strength on XRD of each of the byproducts (K-TPA and K-MMT) was relatively low compared to potassium carbonate due to the high crystallinity of the byproducts (k-TPA and K-MMT).

[Comparison of Reaction Characteristics of Depolymerization Performed at Elevated Temperature Above Room Temperature]

Table 10 shows the observation results of the methanolysis depolymerization characteristics of a polymer having an ester functional group under reaction conditions in which a polar aprotic solvent was used, and reaction temperature was performed at 60° C. above room temperature.

Unlike the low-temperature (25° C.) depolymerization reactions shown in Table 3 or Table 4, most of the PET was degraded within a short reaction time (9 hours). In methanolysis performed at relatively high reaction temperatures, high reactivity can be obtained. However, since the rate of side reaction also increases, the yield of the resulting monomer product is limited. Except for the case where THF is used as a solvent (Example 33), the yield of DMT was observed to be 80% or less in all of the other cases.

The results indicate that although the reaction temperature can be controlled to facilitate the PET depolymerization reaction, the selection of a polar aprotic solvent and the setting of corresponding optimal reaction conditions for inhibiting the rate of a side reaction are crucial for improving the performance of the PET polymerization.

TABLE 10

| | | | Mole of Cpd. per mole of polymer (PET) repeating unit | | | Conversion rate | Yield (%) | | |
|---|---|---|---|---|---|---|---|---|---|
| Ex. # | Type of Polar solvent | Rxn. Time (h) | MeOH | solvent | $K_2CO_3$ | (%) | DMT | HEMT | MMT |
| Ex. 32 | Chlorobenzene | 9 | 50 | 50 | 0.2 | 100.0 | 77.44 | 0.50 | 22.04 |
| Ex. 33 | THF | 9 | 50 | 50 | 0.2 | 99.15 | 84.13 | 0.94 | 13.87 |
| Ex. 34 | 1,4-Dioxane | 9 | 50 | 50 | 0.2 | 94.96 | 75.39 | 0.58 | 15.71 |
| Ex. 35 | Anisole | 6 | 50 | 50 | 0.2 | 100.0 | 75.10 | 0.51 | 24.21 |
| | Anisole | 9 | 50 | 50 | 0.2 | 100.0 | 72.12 | 0.38 | 27.43 |
| Ex. 36 | Toluene | 9 | 50 | 50 | 0.2 | 100.0 | 71.18 | 0.33 | 28.13 |

Changes in PET methanolysis reaction characteristics with the use of a heated polar aprotic solvent (reaction temperature: 60° C.)

THF: Tetrahydrofuran,

Anisole: Methylphenylether,

DCM, Dichloromethane,

DMT: Dimethyl terephthalate,

HEMT: 1-(2-Hydroxyethyl)4-methyl terephthalate,

MMT: Mono-Methyl terephthalate or metal cation exchanged form substitution of metal cation ($K^+$) is determined to be mixed. In the case of Example 1 in which the optimum amount of catalyst is used, potassium mono-methyl terephthalate (K-MMT) formed by substitution of metal cation ($K^+$) is determined to be mixed with the catalyst in the recovered solid phase.

The composition of catalysts and by-products in the recovered solid phase could be quantified (see Table 7) by high performance liquid chromatography (HPLC) as described above, with each component not appearing proportional to the strength of each peak of the XRD. In other

[Changes in Yield of DMT by Moisture Removal]

Table 11 shows the results of the methanolysis reaction designed to limit the moisture concentration to a low level during the PET decomposition by adding a small amount of a molecular sieve that can effectively remove moisture from reactants. When the mass ratio of the used polar solvent (DCM) per unit mass of the polymer was maintained at 6 or more, complete polymer decomposition occurred and DMT was produced in a high yield of 900 or more.

TABLE 11

Changes in PET methanolysis reaction performance by moisture removal using molecular sieve (reaction temperature: 25° C., reaction time: 24 hr)

| Ex. # | Moisture Removal (direct application to reactant) | ratio of mass (molar ratio*) of added compound to unit mass of polymer (PET) | | | Conversion rate (%) | Yield (%) | | |
|---|---|---|---|---|---|---|---|---|
| | | MeOH | DCM | $K_2CO_3$ | | DMT | HEMT | MMT |
| Ex. 37 | MS 3 Å, 33 mg | 3(18.0) | 3(6.8) | 0.07(0.1) | 79.64 | 70.93 | 3.15 | 5.05 |
| Ex. 38 | MS 3 Å, 33 mg | 3(18.0) | 6(13.6) | 0.07(0.1) | 100.0 | 90.88 | 4.08 | 4.03 |
| Ex. 39 | MS 3 Å, 33 mg | 3(18.0) | 9(20.3) | 0.07(0.1) | 100.0 | 91.92 | 3.87 | 3.02 |
| Ex. 40 | MS 3 Å, 33 mg | 3(18.0) | 12(27.1) | 0.07(0.1) | 100.0 | 95.60 | 1.50 | 2.08 |

*The number in parentheses is the number of moles of added compound per mole of repeating units of polymer (PET)
DCM, Dichloromethane,
DMT: Dimethyl terephthalate,
HEMT: 1-(2-Hydroxyethyl)4-methyl terephthalate,
MMT: Mono-Methyl terephthalate or metal cation exchanged form On the other hand, to inhibit side reactions, an absorbent can be used instead of an adsorbent, or a method of preprocessing the raw materials for moisture removal before the reaction. The results of experimental examples concerning these methods are shown in Table 12.

In the case of Comparative Example 15 in which moisture control was not performed, the DMT yield was as low as 87%, while the concentration of MMT, which was a byproduct obtained by partial hydrolysis, was high, for example, 7.7% or higher. In order to control the moisture content involved in the reaction, in the case (Example 41) of adding a dehumidifier using anhydrous sodium sulfate) with little effect on methanolysis reactivity to the reactants and then performing the reaction, and the case (Example 42) of preprocessing by introducing an adsorbent having moisture-selective adsorption property to a preceding stage to the reaction, the hydrolysis reaction was suppressed to a similar level to the case (Example 38) in which the reaction was performed in the presence of an adsorbent. Similar hydrolysis inhibitory effects were observed in the case (Example 43) in which the polymer raw materials and anhydrous compounds were preliminarily dried for moisture removal.

TABLE 12

Change in PET methanolysis performance between preliminary moisture removal (before reaction) and in-site moisture removal (during reaction) (reaction temperature: 60° C., reaction time: 2 hr, and mass ratio of methanol: DCM: $K_2CO_3$ added per unit mass of polymer (PET) = 3 g:6 g:0.07 g)

| | Dehydration method | | Conversion rate (%) | Yield (%) | | |
|---|---|---|---|---|---|---|
| | Method | Condition | | DMT | HEMT | MMT |
| C.Ex. 15 | — | not used | 100.0 | 87.27 | 5.02 | 7.71 |
| Ex. 38 | MS 3 Å, 33 mg | direct application to reactant | 100.0 | 90.88 | 4.08 | 4.03 |
| Ex. 41 | $Na_2SO_4$, 100 mg | direct application to reactant | 100.0 | 91.95 | 3.96 | 4.83 |
| Ex. 42 | MS 3 Å, 33 mg | preprocessing (for 12 hr) prior to start of reaction | 100.0 | 91.12 | 4.37 | 3.48 |
| Ex. 43 | Vacuum drying (80° C.) | preprocessing (for 12 hr) prior to start of reaction | 100.0 | 91.86 | 4.18 | 3.40 |

DCM, Dichloromethane,
DMT: Dimethyl terephthalate,
HEMT: 1-(2-Hydroxyethyl)4-methyl terephthalate,
MMT: Mono-Methyl terephthalate or metal cation exchanged form Specific parts of the present disclosure have been described in detail, and those who ordinarily skilled in the art will appreciate that the specific parts described are only for illustrative purposes and the scope of the present disclosure is not limited by the specific parts described above. Thus, the substantial scope of the present disclosure will be defined by the appended claims and their equivalents.

INDUSTRIAL APPLICABILITY

The depolymerization method for a polymer having an ester functional group, according to the present disclosure, does not require a high investment cost due to the simplicity of the process. In addition, the depolymerization method can considerably reduce energy consumption as compared to conventional processes because methanol addition depolymerization can be performed at high yields even at low temperatures. Due to the advantages, it is possible to implement an environment-friendly process in which carbon dioxide emissions are significantly reduced. Given the advantages, the present disclosure has industrial applicability.

The invention claimed is:

1. A depolymerization method for a polymer comprising an ester functional group, the method comprising:
   contacting a polymer comprising the ester functional group with a mixture comprising (1) an alcohol, (2) potassium carbonate ($K_2CO_3$) serving as a catalyst, and (3) a polar aprotic solvent so as to cause a depolymerization reaction of the polymer,
   wherein the depolymerization reaction is carried out at a reaction temperature of 10° C. to 80° C. under conditions such that the potassium carbonate is present as a heterogeneous solid phase in the mixture, and
   wherein the method further comprises, after the depolymerization reaction, separating from the reaction mixture a solid undissolved in the reaction mixture by filtration, the solid comprising potassium carbonate.

2. The method of claim 1, wherein the alcohol is a straight-chain primary alcohol.

3. The method of claim 1, wherein the polar aprotic solvent is a chain or cyclic organic compound, an organic compound to which a halogen element is directly bonded, or an ether-type organic compound in which two organic groups are linked to each other via an oxygen atom.

4. The method of claim 1, wherein the polar aprotic solvent is one or more selected from the group consisting of toluene, xylene, acetone, methylethylketone, methylisobutylketone, acetonitrile, propionitrile, aminopropionitrile, methylaminopropionitrile, iminodipropionitrile, butylonitrile, methylbutenitrile, butanenitrile, methylethylether, diethylether, methylphenylether, ethylphenylether, dimethoxybenzene, trimethoxybenzene, methoxyphenol, tetrahydrofuran, methyltetrahydrofuran, dioxane, chloromethane, dichloromethane, chloroform, chlorobenzene, and dichlorobenzene.

5. The method of claim 1, wherein the alcohol is comprised in an amount corresponding to a mole number that is 0.1 to 5,000 times the number of moles of a repeating unit of the polymer having the ester functional group, and
   the polar aprotic solvent is comprised in an amount corresponding to a mole number that is 0.1 to 5,000 times the number of moles of the repeating unit of the polymer having the ester functional group.

6. The method of claim 1, further comprising removing moisture from any one or more of the alcohol, the potassium carbonate, the polar aprotic solvent, and the polymer having the ester functional group, which are raw materials for a depolymerization reaction.

7. The method of claim 1, wherein the depolymerization reaction is performed at a reaction temperature in a range of 20° C. to 35° C.

8. The method of claim 1, wherein the solid separated by filtration comprises potassium carbonate and includes at least 35% of an amount of potassium carbonate initially added to the depolymerization reaction.

9. A method of purifying a monomer obtained by depolymerizing a polymer having an ester functional group, the method comprising:
   causing deactivation of a catalyst by adding an acid or an ion exchange resin to a reaction mixture containing a monomer obtained by the method of claim 1; and
   partially or completely separating or recovering the solvent used for the depolymerization by filtration, distillation, evaporation, drying, extraction, or any combination thereof.

10. The method of claim 9, characterized in obtaining a highly purified monomer by performing evaporation or distillation on the mixture from which the solvent has been partially or completely removed.

11. A method of purifying a monomer produced through depolymerization of a polymer having an ester functional group, the method comprising:
   performing filtration, distillation, evaporation, drying, extraction, or any combination thereof on a reaction mixture containing a monomer obtained by the method of claim 1 to partially or completely separate or recover the solvent used in the depolymerization;
   adding an excessive amount of water to a target solution that remains after the partial or complete separation or recovery of the solvent, to recrystallize the monomer; and
   performing filtration, evaporation, drying, or any combination thereof on the recrystallized monomer to obtain a highly purified monomer.

12. A composition for depolymerizing a polymer having an ester functional group, the composition comprising (1) an alcohol, (2) potassium carbonate ($K_2CO_3$) serving as a catalyst, and (3) a polar aprotic solvent,
   wherein the potassium carbonate is present as a heterogeneous solid phase in the composition at a temperature of 10° C. to 80° C.

13. A method of purifying a monomer obtained by depolymerizing a polymer having an ester functional group, the method comprising:
   causing deactivation of a catalyst by adding an acid or an ion exchange resin to a reaction mixture containing a monomer obtained by the method of claim 2; and
   partially or completely separating or recovering the solvent used for the depolymerization by filtration, distillation, evaporation, drying, extraction, or any combination thereof.

14. The method of claim 13, characterized in obtaining a highly purified monomer by performing evaporation or distillation on the mixture from which the solvent has been partially or completely removed.

15. A method of purifying a monomer produced through depolymerization of a polymer having an ester functional group, the method comprising:
   performing filtration, distillation, evaporation, drying, extraction, or any combination thereof on a reaction mixture containing a monomer obtained by the method of claim 2 to partially or completely separate or recover the solvent used in the depolymerization;

adding an excessive amount of water to a target solution that remains after the partial or complete separation or recovery of the solvent, to recrystallize the monomer; and performing filtration, evaporation, drying, or any combination thereof on the recrystallized monomer to obtain a highly purified monomer.

\* \* \* \* \*